US012201587B2

(12) United States Patent
Biehl et al.

(10) Patent No.: US 12,201,587 B2
(45) Date of Patent: Jan. 21, 2025

(54) INSTALLATION FOR PRODUCING A MEDICAL PREPARATION

(71) Applicant: Fresenius Kabi Deutschland GmbH, Bad Homburg (DE)

(72) Inventors: Martin Biehl, St. Wendel (DE); Michael Hock, Münzenberg (DE); Henrik Schaake, Bad Homburg (DE); Ulla Schöbel, Köthen (DE); Holger Lenkeit, Dessau (DE); Marcel Borgward, Neuenstadt/Stein am Kocher (DE)

(73) Assignee: FRESENIUS KABI DEUTSCHLAND GMBH, Bad Homburg (DE)

( * ) Notice: Subject to any disclaimer, the term of this patent is extended or adjusted under 35 U.S.C. 154(b) by 0 days.

(21) Appl. No.: 18/378,607

(22) Filed: Oct. 10, 2023

(65) Prior Publication Data

US 2024/0180782 A1 Jun. 6, 2024

Related U.S. Application Data

(63) Continuation of application No. 17/316,052, filed on May 10, 2021, now Pat. No. 11,793,723, which is a continuation of application No. 16/084,367, filed as application No. PCT/EP2017/056099 on Mar. 15, 2017, now Pat. No. 11,000,451.

(30) Foreign Application Priority Data

Mar. 15, 2016 (EP) .................................... 16160331

(51) Int. Cl.
*A61J 3/00* (2006.01)
*B65B 3/00* (2006.01)

(52) U.S. Cl.
CPC ............ *A61J 3/002* (2013.01); *A61J 2200/74* (2013.01); *B65B 3/003* (2013.01)

(58) Field of Classification Search
CPC ........ A61J 3/002; A61J 2200/74; F04B 43/12
See application file for complete search history.

(56) References Cited

U.S. PATENT DOCUMENTS 3,429,273 A 2/1969 Jones, Jr.
3,647,118 A 3/1972 Johnson et al.
4,012,176 A 3/1977 Drori
4,132,509 A 1/1979 Bongartz et al.
D263,871 S 4/1982 Matsuura
4,473,173 A 9/1984 Degroff et al.
4,960,117 A 10/1990 Moncrief et al.
5,037,390 A 8/1991 Raines et al.
5,040,699 A 8/1991 Gangemi
5,064,358 A 11/1991 Calari
(Continued)

FOREIGN PATENT DOCUMENTS

CN 106439107 B 3/2019
EP 1148936 B1 7/2006
(Continued)

*Primary Examiner* — Daphne M Barry
(74) *Attorney, Agent, or Firm* — Blank Rome LLP

(57) ABSTRACT

An installation for producing a parenteral nutrition is described. The installation includes a pump with which liquids can be transferred from a plurality of source containers into a target container. The installation has a modular construction and includes a weighing module and a main module with the pump.

19 Claims, 19 Drawing Sheets

(56) References Cited

U.S. PATENT DOCUMENTS

| | | | | |
|---|---|---|---|---|
| 5,228,485 | A | 7/1993 | Lewis et al. | |
| D344,585 | S | 2/1994 | Morse | |
| 5,460,493 | A | 10/1995 | Deniega et al. | |
| 5,697,407 | A * | 12/1997 | Lasonde | A61J 3/002 141/10 |
| 5,927,349 | A | 7/1999 | Martucci et al. | |
| 7,555,437 | B2 | 6/2009 | Pierce | |
| 10,369,349 | B2 | 8/2019 | Nelson | |
| 10,806,673 | B2 | 10/2020 | Zollinger et al. | |
| 10,851,901 | B2 | 12/2020 | Liberman et al. | |
| 11,090,479 | B2 | 8/2021 | Biehl et al. | |
| 2005/0086008 | A1 | 4/2005 | Digianfilippo et al. | |
| 2009/0065724 | A1 | 3/2009 | Mitton et al. | |
| 2009/0154764 | A1 | 6/2009 | Khan et al. | |
| 2009/0247985 | A1 | 10/2009 | Melsheimer et al. | |
| 2012/0199239 | A1 | 8/2012 | Okuda et al. | |
| 2016/0310362 | A1 | 10/2016 | Lane et al. | |
| 2016/0310920 | A1 | 10/2016 | Brown et al. | |
| 2019/0070074 | A1 | 3/2019 | Biehl et al. | |
| 2020/0276086 | A1 | 9/2020 | Biehl et al. | |
| 2020/0289371 | A1 | 9/2020 | Biehl et al. | |
| 2020/0289372 | A1 | 9/2020 | Biehl et al. | |

FOREIGN PATENT DOCUMENTS

| | | | |
|---|---|---|---|
| EP | 1997471 | A1 | 12/2008 |
| EP | 2446875 | A1 | 5/2012 |
| EP | 2947019 | A1 | 11/2015 |
| JP | H9-225008 | A | 9/1997 |
| JP | 6506168 | B2 | 4/2019 |
| WO | 84/000138 | A1 | 1/1984 |
| WO | 9963547 | A2 | 12/1999 |
| WO | 2014062614 | A1 | 4/2014 |
| WO | 2017140849 | A | 8/2017 |

* cited by examiner

INSTALLATION FOR PRODUCING A MEDICAL PREPARATION

CROSS-REFERENCE TO RELATED APPLICATIONS

This application is a continuation of U.S. patent application Ser. No. 17/316,052, filed May 10, 2021, which is a continuation of U.S. patent application Ser. No. 16/084,367, filed Sep. 12, 2018, and issued as U.S. Pat. No. 11,000,451 on May 11, 2021, which is a U.S. National Phase application of International Patent App. No. PCT/EP2017/056099, filed Mar. 15, 2017, which claims the benefit of European Patent App. No. 16160331.1, filed Mar. 15, 2016. The contents of the aforementioned applications are incorporated herein by reference in their entireties.

FIELD OF THE INVENTION

The invention relates to an installation for producing a medical preparation. The invention relates in particular to an installation by which, for example, infusion bags and/or syringes are filled for parenteral nutrition.

BACKGROUND OF THE INVENTION

Installations for producing a medical preparation, in particular for producing a preparation for parenteral nutrition, are used, for example in pharmacies or hospitals, in order to dispense a patient-specific preparation, in particular a mixture of different basic nutrients, trace elements and vitamins, if appropriate also together with a pharmaceutical.

Installations of this kind are also referred to as TPN compounders (TPN=total parenteral nutrition). Installations that are known in practice and are commercially available, for example the MultiComp® system from Fresenius, comprise a computer-controlled pump unit by means of which the constituents of the composition are transferred from different source containers into a target container located on a balance.

There are strict requirements governing the safety and user-friendliness of such installations. A disadvantage of known installations is that they are often large and heavy and cannot therefore be transported by one person.

Furthermore, the balances that are used in conventional installations do not permit a very precise weighing result. This is due not only to the tolerance of the weighing cell used, but also to the fact that a balance on which a target container is suspended, for example, is subjected to alternating tensile forces of the connection hose, which adversely affects the measurement result.

OBJECT OF THE INVENTION

In light of the above, the object of the invention is to make available an installation for producing a medical preparation, in particular an installation for producing a preparation for parenteral nutrition, which installation can be set up and/or operated comfortably and safely.

SUMMARY OF THE INVENTION

The object of the invention is achieved in the first instance by an installation for producing a medical preparation, and also by a valve unit for an installation for producing a medical preparation, according to one of the independent claims.

Preferred embodiments and developments of the invention may be gathered from the subject matter of the dependent claims, the description and the drawings.

The invention relates on the one hand to an installation for producing a medical preparation, which installation is configured in particular for producing a preparation for parenteral nutrition.

The installation comprises a pump, in particular a peristaltic pump. According to the invention, the peristaltic pump can be a roller pump in one embodiment. With the pump, liquid can be transferred from a plurality of source containers into a target container. For this purpose, the installation preferably comprises a valve unit with which the connection to a source container can in each case be opened, such that liquid can be withdrawn from the source container by means of the pump.

This procedure is preferably controlled by computer. The user can program patient-specific recipes or select these from a database. The installation is then started up by the user and a filling procedure for a target container, in particular an infusion bag or a syringe, is carried out by means of liquids being pumped from different source containers into the target container in a plurality of metering steps.

According to the invention, the installation has a modular construction and comprises at least one balance module and/or a screen module, and also a main module with the pump.

A balance module is understood as a device with a balance that can preferably be set up next to the main module.

The balance module comprises at least one weighing cell and a seat for a target container. Moreover, the balance module can also comprise electronic control and regulation components of the balance. The balance module is preferably connected by an electric cable, in particular via an electronic interface, to the main module and/or an external control device.

The installation comprises a screen module additionally or alternatively to the balance module.

Thus, a modular component in the form of a screen is provided via which the installation can be operated preferably by touch control.

The screen module is preferably connected to the main module by an electric cable and/or an electronic interface.

The main module comprises at least the pump for transferring the liquids. The main module preferably also comprises electronic control and regulation components, in particular a computer, with which the pump and the valves are activated.

Moreover, the main module preferably comprises the valve unit. Provision is made in particular for a valve unit to be made available as a disposable component which is exchanged after a predetermined period of use and/or after a predefined volume has flowed through it.

For this purpose, the valve unit preferably comprises hoses and connections for the connection of the source containers, and also a further connection for connecting the target container to the valve unit, which further connection can likewise be configured as a hose.

The connection hose for the target container is preferably inserted into a peristaltic pump. On the way from the source containers to the target container, the transferred liquids thus come into contact only with the valve unit configured as a disposable component, and not with the other components of the installation.

By virtue of the modular construction, a compact configuration of the installation is permitted in which at the same time the components are so light that they can be transported preferably by one person.

Balance module and/or screen module can preferably be separated from the main module without use of tools.

In particular, balance module and/or screen module are separate units that can be lifted and moved independently.

However, a positioning means is preferably provided at least for the balance module and, when the balance module is set down next to the main module, ensures a defined spacing, i.e. always the same spacing.

In particular, the installation comprises a frame on which balance module and main module are arranged in a defined position relative to each other.

The frame is configured in particular as a subframe onto which the balance module and the main module can be mounted.

The frame preferably comprises a seat for the main module and a seat for the balance module, wherein the seats for the main module and the seats for the balance module can have form-fit elements, into which form-fit elements of the balance module and of the main module engage.

Provision is made in particular that the frame has recesses, in particular bores, into which feet of the main module and of the balance module can be inserted. In a preferred embodiment of the invention, only the rear feet of the main module and of the balance module are inserted into the frame. The frame is therefore not in the way in the front region of the installation.

The frame has the effect that the main module and the balance module adopt a defined position relative to each other. In particular, it ensures that there is a constant distance of the connection of a target container from an installation-side connection.

Fluctuating forces that arise on account of the connection hose of the target container, and that influence the weighing result, are reduced by virtue of this defined distance.

Moreover, the generally lighter balance module, by virtue of being connected to the main module that is preferably heavier than the balance module, is safeguarded against inadvertent displacement.

In one embodiment of the invention, the balance module comprises a balance pan which at least partially spans a space between the main module and the balance module.

A connection of an inserted target container can thus be placed closer to the main module. As a result of the associated coming together of the valve unit and the target container connection, the hose length and therefore the dead volume can be reduced.

In a preferred embodiment of the invention, the balance pan is inclined obliquely upward in the direction of the main module.

A target container, configured as an infusion bag, can be suspended in such a balance pan on form-fit elements, for example on pins, and thus has a defined position with respect to the balance pan and also with respect to the other components of the installation.

Furthermore, the connection of the target container can lie approximately at the height of an installation-side connection for the target container, which likewise reduces the forces introduced onto the balance by the connection hose.

The screen module preferably comprises a touchscreen pivotable on a hinge.

Preferably, the screen module is not connected fixedly to another component of the installation, in particular to the frame, and instead it can be freely positioned by the user of the installation.

Provision is made in particular to make available a screen with a base that can be positioned on a right-hand side and left-hand side of the installation, such that the installation can be easily adapted for operation by right-handed persons and left-handed persons.

In a preferred embodiment, the base comprises at least one recess in which a seat of the frame or a foot of the main module can engage.

The base is fork-like or fork-shaped, such that it can be pushed under the main module.

This on the one hand permits a compact configuration and on the other hand allows the screen module to be pushed under the main module at a right-hand side and left-hand side, wherein the respective front foot of the main module or a seat for the main module engages in the recess between the two forks of the screen module.

In one embodiment of the invention, the installation, preferably the screen module, comprises a reader for an electronic memory, in particular a memory chip.

This memory serves preferably for simple identification of the user of the installation.

In particular, an RFID reader is provided in the screen module. The user carries an RFID chip, for example on a card, and is thus able to register wirelessly with the installation, in order to enable operation of the installation via the touchscreen.

In one embodiment of the invention, the main module comprises a seat for a scanner. The scanner permits reading of barcodes, for example barcodes on source and/or target containers. These barcodes can serve to control the installation.

According to a preferred embodiment of the invention, the holder for the scanner can also be positioned at different locations in order to adapt the installation to different users, in particular to right-handed users and left-handed users.

For this purpose, in a preferred embodiment of the invention, the seat for the scanner is held magnetically on an upper housing front of the main module. In particular, the seat for the scanner can comprise a magnet and can thus be easily detached.

The invention further relates to an installation for producing a medical preparation, in particular an installation having one or more of the features described above and/or below.

The installation comprises a pump, in particular a peristaltic pump, with which liquids can be transferred from a plurality of source containers into a target container.

According to the invention, the pump is arranged on a housing front, wherein the pump is arranged at an inclination with respect to a vertical plane.

A vertical plane is understood as the plane which, when the installation has been set up, is spanned by vertical outer edges of a housing of the installation.

The position of the pump, in particular of the peristaltic pump, is defined by a plane which is perpendicular to the axis of rotation of an impeller of the peristaltic pump.

According to the invention, the plane described by the rotation of the impeller is not oriented vertically but instead inclined at an angle.

Provision is made in particular that the pump is inclined with respect to the vertical plane at an angle of 10° to 80°, preferably 15° to 50°, particularly preferably 20° to 40°.

The pump is thus arranged at an angle on a housing front of the installation.

This permits better accessibility of the pump and in particular facilitates cleaning after detachment of the impeller.

At the same time, compared to a pump that is not arranged at an inclination on the housing front, the kink angles of the inserted hose with respect to the top of the housing of the installation are reduced.

Compared to a pump that is placed flat on the top of the housing, the tilted arrangement in turn permits a compact configuration of the installation.

Preferably, an upper portion of the housing front is angled. It is therefore not only the pump that is inclined but also an entire portion of an upper housing front on which the pump is mounted.

This inclined portion creates space for an inclined screen and thus permits a more compact configuration.

Moreover, the scanner or the seat for the scanner is preferably also arranged in the angled portion, which also makes it easier for the user to reach the scanner.

The invention further relates to an installation for producing a medical preparation, in particular an installation having one or more of the features described above and/or below. The installation comprises at least one pump, in particular a peristaltic pump, with which liquids can be transferred from a plurality of source containers into a target container.

According to the invention, the installation comprises at least two, preferably three, cascaded valve nodes which each have connections for the source containers.

As was described at the outset, the valve units for the installation in question are configured as a disposable component.

A valve unit has a plurality of valves which can be opened and closed via an actuation member in order thereby to control the metering from different source containers. Carriers for the actuation members are provided on the installation side. The valve unit can be fitted onto the installation, and the valves can be opened and closed via the computer-controlled carriers on the installation side.

Depending on what medical preparations are produced and/or depending on the quantity in which the medical preparations are produced, a different number of source containers from which liquids are removed are needed.

This has among other things the disadvantage that valve units with a great many valves are customarily used, even when the installation is operated by the user only with a small number of source containers.

At the same time, if installations with a different number of connections to source containers are made available by the manufacturer, it would be necessary to offer different valve units.

The invention proposes that at least two valve nodes are arranged in a cascaded configuration, i.e. connected in series. The outlets of the individual valves in this case open into a central channel. By using a different number of valve nodes, it is thus possible to make available a valve unit with a different number of connections.

A valve node preferably has 4 to 20 connections for each source container. A valve unit with cascaded valve nodes preferably comprises 2 to 4 valve nodes.

The cascaded valve units are preferably mounted, in particular locked, on a seat on a housing and are connected by means of hoses.

It is thereby possible, in a simple way, to make available valve units having a different number of valve nodes.

Moreover, the installation can be offered by the manufacturer in different versions, for example as an installation for a valve unit with only one valve node or as an installation with several valve nodes, which installation has a correspondingly greater number of connections for source containers.

Depending on how many source containers are in use, the user can also temporarily employ different valve units having a different number of valve nodes.

The invention further relates to a valve unit for an above-described installation, said valve unit comprising at least two valve nodes which are connected to a hose.

By way of this hose, liquid is conveyed from an outer valve node through an inner valve node to a connection for a target container.

The invention further relates to an installation for producing a medical preparation, in particular an installation having one or more of the features described above and/or below.

The installation comprises at least one pump, in particular a peristaltic pump, with which liquids can be transferred from a plurality of source containers into a target container.

According to the invention, the installation comprises a directional control valve which is arranged downstream from the pump in the direction of flow and via which a target container with at least two chambers can be filled or at least two different target containers can be filled.

Provision is made in particular that a directional control valve is arranged between the valve unit and the target container.

The directional control valve is in particular a three-port directional control valve which has an inlet from which the liquid can be conveyed, for example, into one or other chamber of the target container.

The directional control valve is preferably configured as a disposable component and is therefore also regularly exchanged.

In a first embodiment, the directional control valve is connected to the target container. Preferably, the directional control valve can be connected inseparably to the target container and, once the filling procedure is completed, is removed from the installation together with the target container.

According to one embodiment of the invention, the directional control valve is actuated via an installation-side carrier. Depending on the embodiment, this carrier can be arranged both on the above-described main module and also on the balance module.

In another embodiment of the invention, the directional control valve is actuated manually.

In a further embodiment, the directional control valve is part of the valve unit and in particular is connected inseparably to the valve unit.

In a further embodiment, the directional control valve is configured as a separate disposable component having connections for the target container, and also a further connection in order to be connected to the installation-side valve unit.

In addition to filling a target container that has two chambers, the directional control valve can also be used to connect, in parallel to the target container, a further target container, in particular a target container referred to as a waste bag, which is therefore discarded after use.

By using this waste bag, it is possible among other things to exchange individual source containers while the target container is connected.

The invention further relates to an installation, in particular an installation having one or more of the features described above and/or below, wherein the installation comprises at least one pump, in particular a peristaltic pump, with which liquids can be transferred from a plurality of source containers into a target container.

The installation has at least one valve node, which can in particular be part of a valve unit.

The valve node can be locked onto a seat.

The seat is preferably configured as a plate which comprises carriers for actuation members of the valve node, which carriers can in particular protrude from the plate.

According to the invention, an edge, in particular a circumferential edge, of the seat is configured as a form-fit element for the lockable valve node.

Therefore, a separate form-fit element for the valve node is not present, and instead the edge of a seat, in particular the protruding edge of a plate, is used to serve as a form-fit element for the valve node.

The installation is thus easier to clean in the region of the seat for the valve node.

The valve node has locking means for locking it on the seat.

In a preferred embodiment of the invention, the housing of the valve node comprises, on the underside, a web which, in the locked state, engages under the edge of the seat.

On the side of the housing opposite the web, a resilient grip is preferably arranged which likewise has a web, the latter engaging under the edge of the seat in the locked state.

Using the resilient grip, the web for removing the valve node can be pulled out via the resilient tab and the valve nod removed.

By way of a grip present on only one side, the valve node can thus also be detached from one side.

The invention further relates to an installation for producing a medical preparation, in particular an installation having one or more of the features described above and/or below.

With the installation, liquids can be transferred from a plurality of source containers into a target container.

According to the invention, the installation comprises at least two pumps.

Provision is made in particular that there is one pump with a greater delivery rate and one pump with a smaller delivery rate, wherein the smaller pump is configured for conveying micro-quantities, i.e. quantities of liquid in particular in the ml range, whereas the main constituents are metered with the other pump with the greater delivery rate.

The pumps are preferably configured as peristaltic pumps.

With a complete revolution of an impeller, the smaller pump delivers quite a small quantity, in particular a quantity that is less than half the quantity delivered by the larger pump upon one revolution of the impeller. The quantity is understood in each case as the volume of the liquid in question.

A smaller pump for the metering of micro-quantities permits more precise metering.

In particular, a pump used as a smaller pump is one in which a hose of smaller diameter is also inserted.

In one embodiment of the invention, the pumps are connected in series.

In another embodiment of the invention, pumps are connected in parallel, in which case it is possible to switch back and forth between the pumps, preferably via a directional control valve.

In a further embodiment of the invention, each pump comprises a separate inlet to the target container. This embodiment of the invention is provided, for example, for filling a target container that has two chambers. Each of the pumps can be connectable to different source containers via in each case one valve unit.

In the valve unit provided for this embodiment of the invention, the valve unit can in particular be connected to a hose which leads in the direction of the target container and which has a first portion, for insertion into the smaller pump, and a second portion of greater diameter, for insertion into the larger peristaltic pump.

The invention further relates to an installation for producing a medical preparation, in particular an installation having one or more of the features described above and/or below.

This installation also comprise a peristaltic pump, with which liquids can be transferred from a plurality of source containers into a target container.

According to the invention, the installation comprises a combined flow/bubble sensor.

The flow/bubble sensor is configured in particular as an ultrasonic sensor and detects when bubbles are transported through the hose and also detects the flow velocity of the medium conveyed in the hose.

The bubble sensor can serve in particular to avoid incorrect filling, for example after complete emptying of a source container, or if air is removed upstream from the combined flow/bubble sensor.

The flow sensor can be used to monitor the quantity of the liquids delivered by the one or more pumps.

By means of the flow sensor, it is possible in particular to detect occlusions even when metering micro-quantities.

In the metering of micro-quantities, there is the problem that, in the event of an occlusion, for example of the connection of the source container, liquid is still transferred into the target container, since hoses, in particular the connection hose of the target container, can contract and thereby permit the delivery of a small quantity of liquid.

If the source container from which the micro-quantity was apparently metered is now closed via the valve unit and another valve is opened, for example for the metering of a main constituent, the hose can relax, and the micro-quantity apparently removed from the source container is aspirated out of the other source container.

However, it has been found that, in the event of an occlusion, the flow velocity drops considerably, in particular the flow velocity between valve unit and peristaltic pump, and this can be detected via the combined flow/bubble sensor.

The combined flow/bubble sensor is therefore preferably arranged downstream from the valve unit and upstream from the pump, with respect to the direction of flow.

The hose length between the combined flow/bubble sensor and the valve unit is therefore small.

The hoses with which the source containers are connected to the valve unit generally have a considerably smaller diameter, such that the dead volume present through these hoses is smaller, which in turn has the effect that there is less danger of a flow apparently occurring, despite occlusion, on account of contracting hoses.

The use of a combined flow/bubble sensor permits a more compact configuration of the installation compared to an installation in which two separate sensors are present.

Furthermore, the combined sensor permits monitoring of bubbles and monitoring of the flow velocity at a single central location, in particular close to the valve unit.

The invention further relates to an installation for producing a medical preparation, comprising a pump with which liquids can be transferred from a plurality of source containers into a target container.

It is in particular an installation having one or more of the features described above and/or below.

According to the invention, the installation comprises a device for wireless transmission of a user identifier. This device can in particular be the above-described reader based on RFID technology.

The device for wireless transmission of a user identifier is in particular integrated in a screen module of the installation.

Through the possibility of wireless transmission of a user identifier, both the operating convenience and the safety of use of the installation are enhanced.

BRIEF DESCRIPTION OF THE DRAWINGS

The subject matter of the invention is explained in more detail below with reference to FIG. 1 to FIG. 28 of the drawings.

FIGS. 23 to 28 of the drawings illustrate the possible difference of the installation from the installation shown in FIG. 1 to FIG. 22.

DETAILED DESCRIPTION

Figure 1:
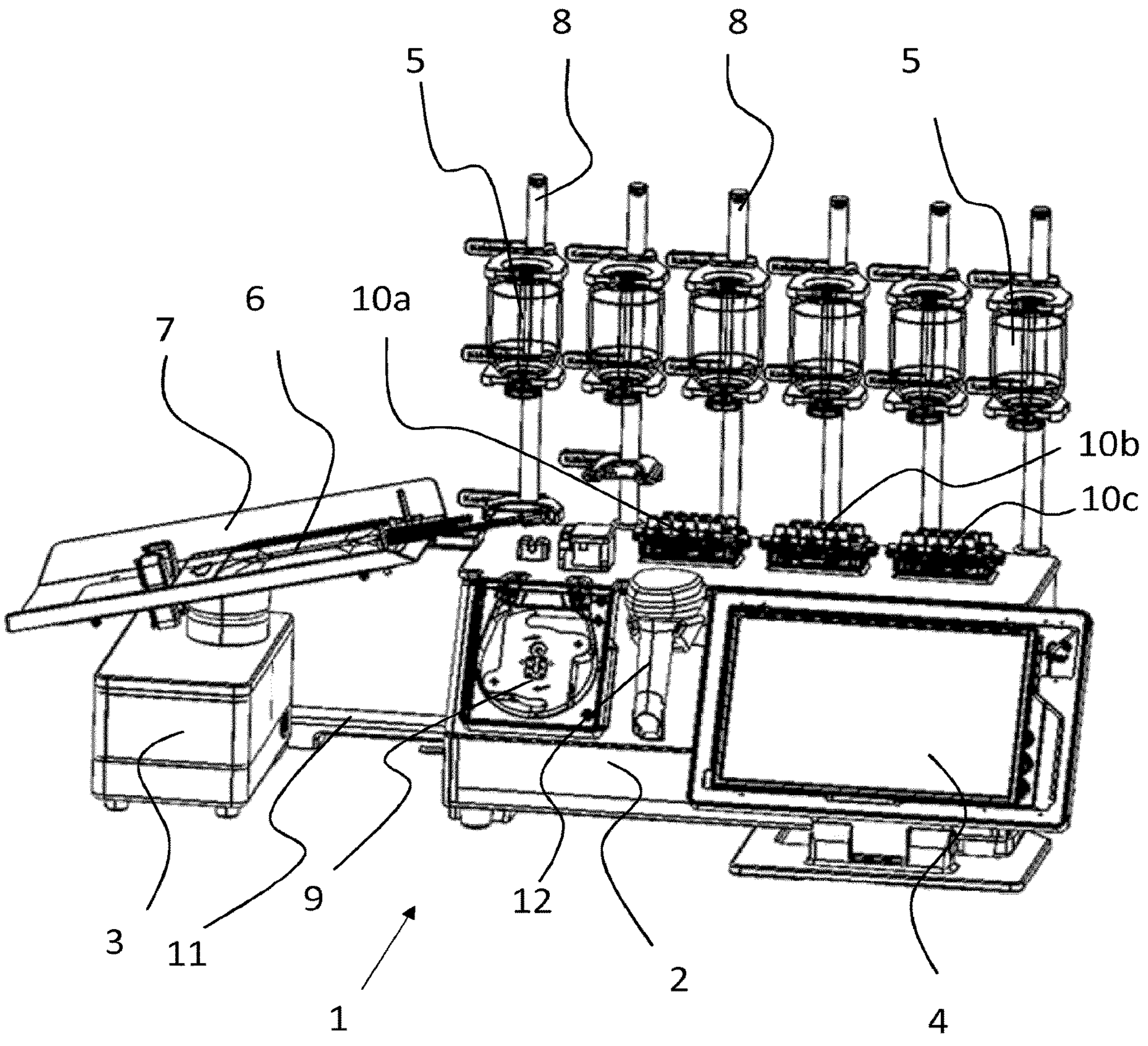
FIG. 1 shows a perspective view of an illustrative embodiment of an installation according to the invention for producing a medical preparation.

FIG. 1 shows a perspective view of an installation 1 for producing a medical preparation in the form of a preparation for parenteral nutrition.

The installation 1 has a modular construction and comprises a main module 2.

The main module 2 comprises a pump 9, which is configured as a peristaltic pump.

The main module 2 further comprises a scanner 12 with which recipe data or barcodes on target containers 6 and/or source containers 5 can be read in.

Three valve nodes 10*a* to 10*c* are arranged on the upper side of the main module and together form a valve unit. The valve nodes 10*a* to 10*c* are connected in a cascaded configuration, which is explained in more detail below.

In addition to the main module 2, the installation 1 comprises a balance module 3 and a screen module 4.

The balance module 3 comprises a balance pan 7 in which a target container 6 is placed.

Balance module 3 and main module 2 are mounted on a subframe 11, which ensures a constant position of balance module 3 and main module 2 relative to each other.

The space between balance module 3 and main module 2 is partially spanned by the balance pan 7, such that the connection of the target container 6 is close to the upper side of the housing of the main module 2.

Moreover, the balance pan 7 is inclined obliquely upward in the direction of the main module 2 with respect to a horizontal plane. In this way, the connection of the target container 6 is likewise close to the upper side of the main module 2, which reduces the length of a hose 36 for connection of the target container 6 to the valve node 10*a*.

The hoses 36, 37 are not shown in this view.

Rods 8 can also be seen on which a plurality of source containers 5 are arranged.

To operate the installation, the source containers 5 are connected via hoses 37 to the valve nodes 10*a* to 10*c*. Moreover, the valve nodes 10*a* to 10*c* are arranged in a cascaded configuration, such that only the valve node 10*a* is connected directly to the target container 6.

The hose 36 used for connection of the target container is guided through the peristaltic pump 9.

By way of the valve unit 60 composed of the valve nodes 10*a* to 10*c*, the desired preparation can be transferred under computer control into the target container 6 by means of the peristaltic pump 9.

In a filling procedure, one of the valves 63 is opened, such that liquid from a source container 5 is pumped into the target container in one metering step by the pump 9. The next valve 63 is then opened. Liquids are removed from the different source containers 5 until the filling procedure is completed.

Preferably, only a single valve 63 (see FIG. 9 for example) leading to a source container 5 is opened at any one time during each individual metering step. Thus, liquid is always being removed from just one source container 5.

In addition to the main constituents of the medical preparation and to the micro-quantities that are located in the source containers 5, each preparation involves what is called a universal liquid, also referred to as "universal ingredient" (UI). This liquid may come into direct contact with every other ingredient without causing an undesired side effect and is used in a relatively large quantity in each preparation, in particular for filling the preparation to the desired total quantity. The universal liquid is in most cases isotonic water.

Provision is made that, when starting the operation of the installation 1 for producing the medical preparation, a first target container called a waste bag is used which is subsequently discarded. This waste bag is connected by means of the valve unit 60 (see FIG. 19 for example), and the hoses

37 leading to all of the source containers 5 are vented by means of a requisite amount of liquid being removed.

The screen module 4, which has a touchscreen for operating the installation 1, is freely movable with respect to the subframe 11 and therefore with respect to the rest of the components of the installation.

In this view, the screen module 4 is located on the right-hand side of the installation 1.

If a left-handed person is operating the installation, the screen module 4 can be shifted to the left.

At the same time, the scanner 12 can then be mounted farther to the right.

Figure 2:
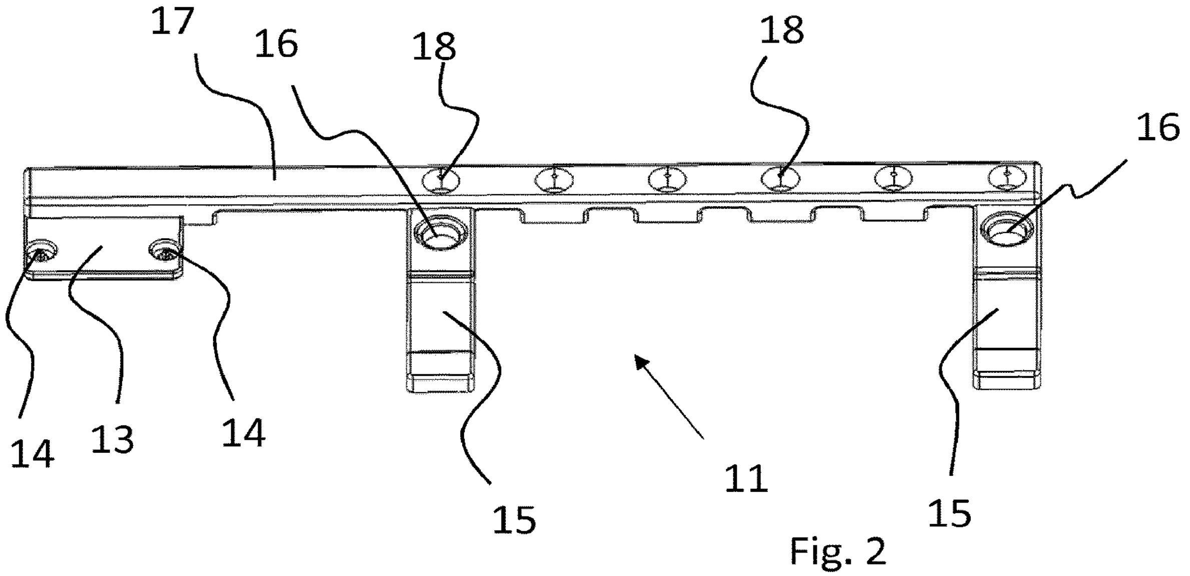
FIG. 2 and FIG. 3 are perspective views of a subframe that forms part of the installation shown in FIG. 1.

FIG. 2 shows a perspective view of the subframe 11.

The subframe 11 has a seat 13 for the balance module 3.

The seat 13 comprises bores 14 into which feet 28*b* of the balance module 3 can be inserted.

The subframe 11 moreover has a seat 15 for the main module 2. The seat 15 protrudes like a fork from the rest of the subframe 11.

The seat 15 for the main module 2 also comprises bores 16, into which two feet 42*b* of the main module 2 can be inserted.

Thus, in the assembled state, balance module 3 and main module 2 are positioned fixedly relative to each other in the horizontal plane.

The distance between balance module 3 and main module 2 is fixed by the portion 17 of the subframe 11.

Behind the seat 15 for the main module 2, the subframe 11 has seats 18 for the rods 8 on which the source containers 5 can be mounted.

Preferably, source containers 5 for quite small quantities are mounted on these rods 8, while bags for example, from which the main constituents of the medical preparation are delivered, can be suspended by hooks from a frame (not shown) remote from the installation.

Figure 3:
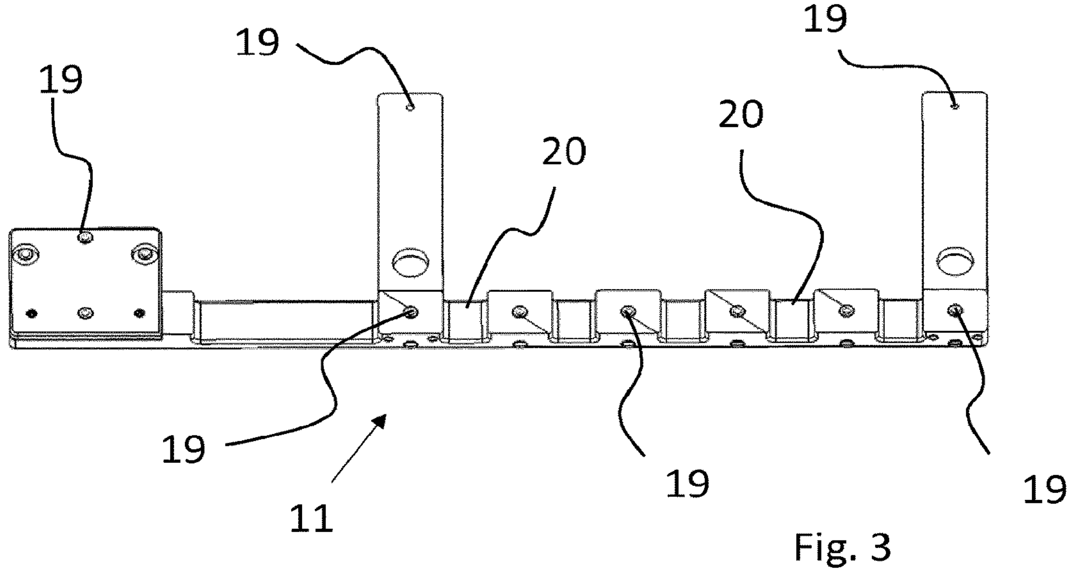

FIG. 3 shows a perspective view of the underside of the subframe 11.

It reveals that the subframe 11 has a plurality of feet 19 which can be formed, for example, as inserted or adhesively bonded elastomer elements.

Between the feet 19, recesses 20 are formed on the underside of the subframe 11 and serve to permit better ventilation under the main module 2.

Figure 4:
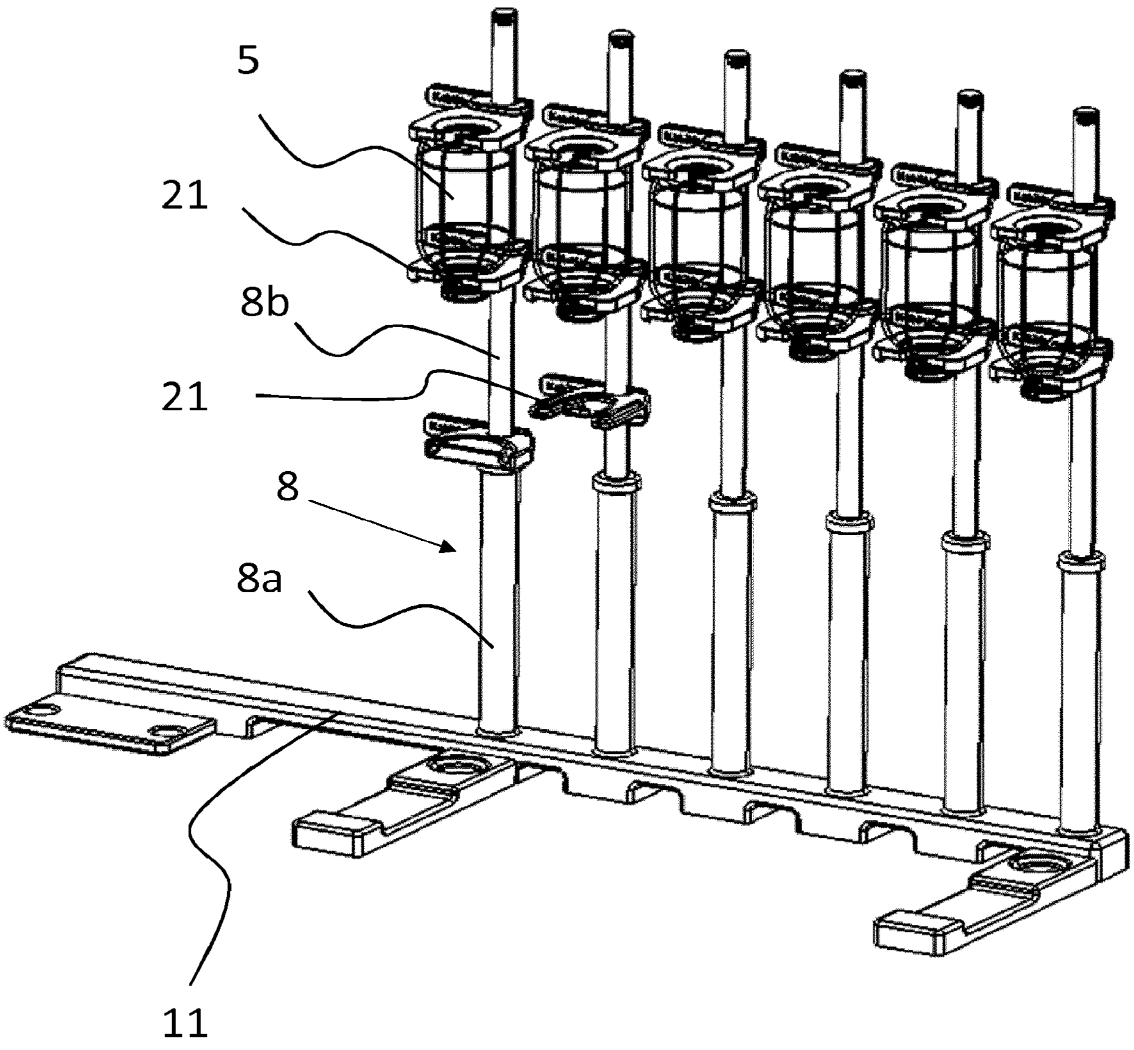
FIG. 4 shows a perspective view of the subframe which, together with rods that have holders for source containers, forms a frame.

FIG. 4 shows a perspective view of the subframe 11, in which the rods 8 are now inserted that serve for mounting the source containers 5.

The rods 8 are composed of a bottom part 8*a* and a top part 8*b* and can be extended telescopically.

Moreover, holders 21 for the source containers 5 can be mounted on the rods 8, which holders 21 are preferably vertically displaceable. A flexible adaptation to different types and sizes of source containers 5 is thereby ensured.

At the same time, the modular concept means that the subframe 11 in the assembled state is fixed by the heavier main module 2, which has the effect that at the same time the rods 8 connected to the subframe 11 are secured against tipping over.

Figure 5:
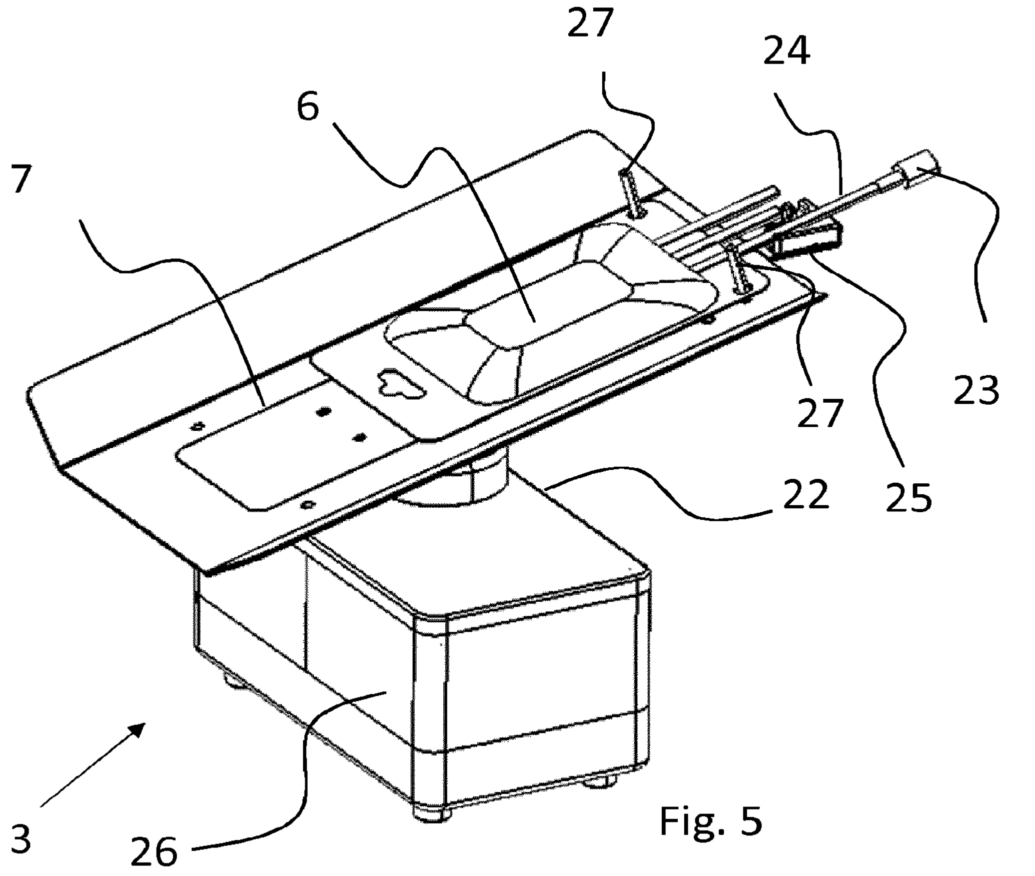
FIG. 5 and FIG. 6 are perspective views of the balance module already shown in FIG. 1.

FIG. 5 shows a perspective view of the balance module 3. The balance module 3 comprises a housing 26 in which the weighing cell (not shown) and, if appropriate, further electronic components for control and regulation are arranged.

The balance pan 7 is configured in the shape or manner of a chute or trough. In this view, a target container 6 is suspended in the pins 27 of the balance pan 7. A defined positioning of the target container 6 on the balance pan 7 is thus ensured.

The balance pan 7 is mounted on the balance 22, in which the weighing cell is arranged.

The balance pan 7 further comprises a hose holder 25, into which the connection hose 24 of the target container 6 can be inserted. The connection 23 of the target container 6 is connected to an installation-side connection 39 of the valve unit 60.

Figure 6:
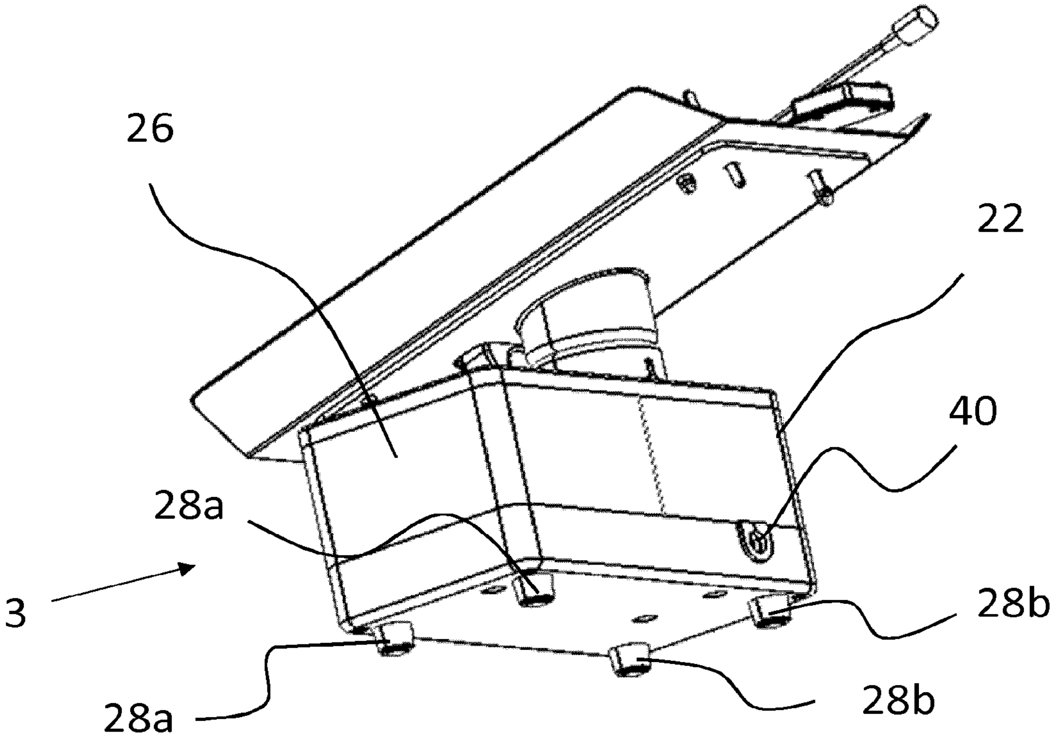

FIG. 6 is a further perspective view of the balance module 3. It reveals that the housing 26 has cylindrical or conical feet 28*a*, 28*b* on the underside.

The feet 28*b* are inserted into the bores 14 of the subframe 11.

It further reveals an electrical connection 40 with which the balance 22 is connected to the main module 2. A plug is preferably provided for the connection.

Figure 7:
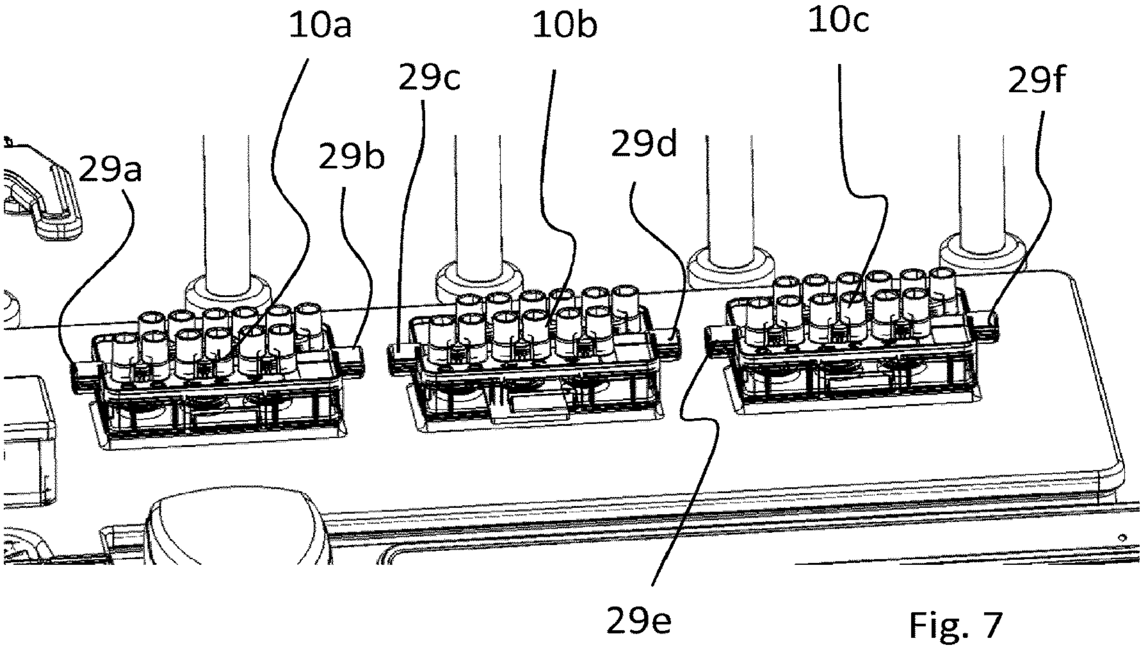
FIG. 7 is a detailed view of the valve nodes.

FIG. 7 shows a detailed view of the main module 2 already shown in FIG. 1.

It reveals that three valve nodes 10*a* to 10*c* are arranged on the housing upper side of the main module 2.

The valve nodes 10*a* to 10*c* each have two connections 29*a* to 29*f*.

Figure 19:
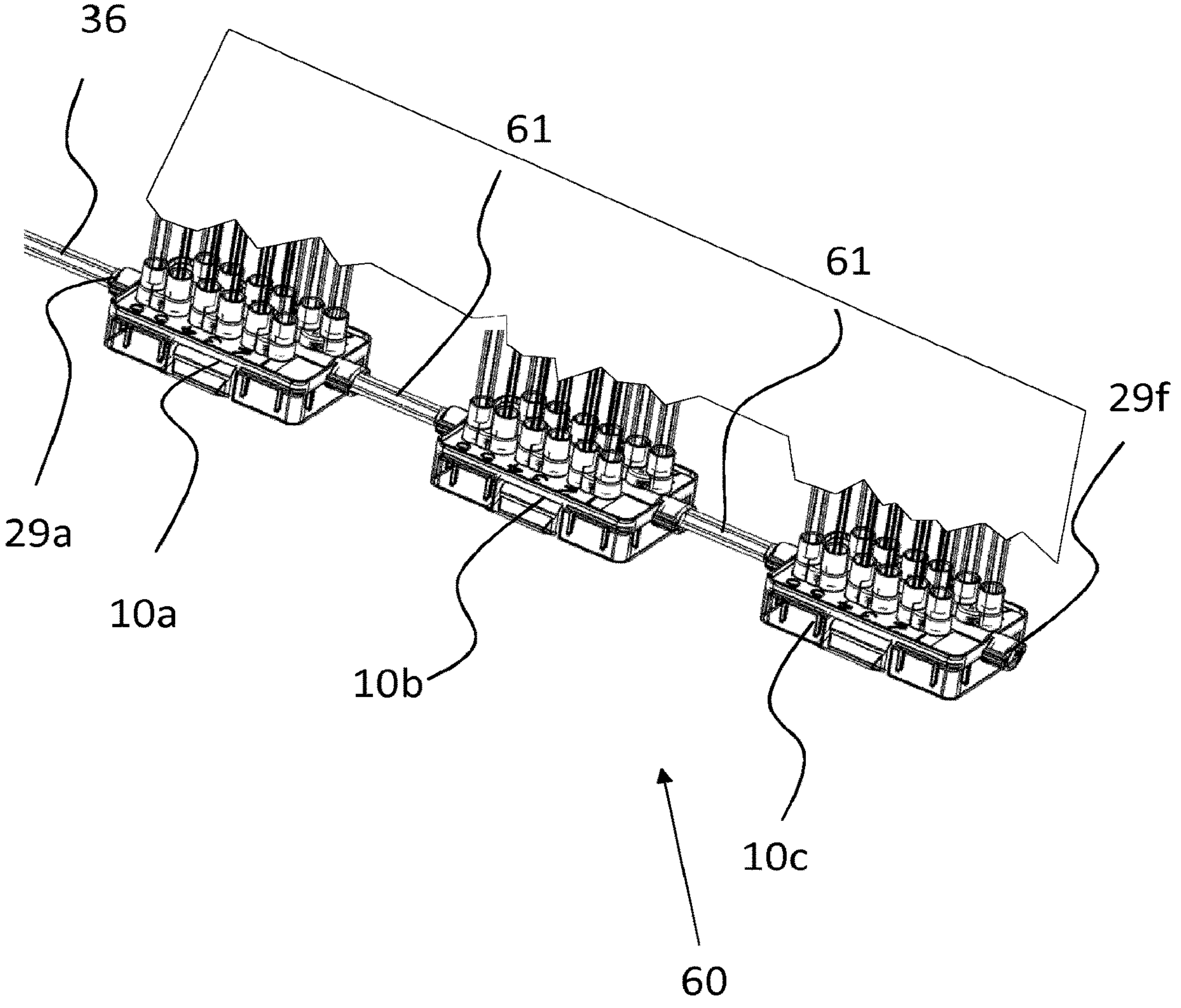
FIG. 19 is a perspective view of a valve unit composed of three valve nodes.

In order to join the valve nodes 10*a* to 10*c* together to form a cascaded valve unit 60, they are connected to hoses 61 (not shown here) (see also FIG. 19 for example). The connections 29*b* and 29*c* and the connections 29*d* and 29*e* are thus connected.

By contrast, the connection 29*a* is connected to a hose 36 that leads to the target container 6 (see also FIG. 19 for example). The connection 29*f* is closed.

Figure 8:
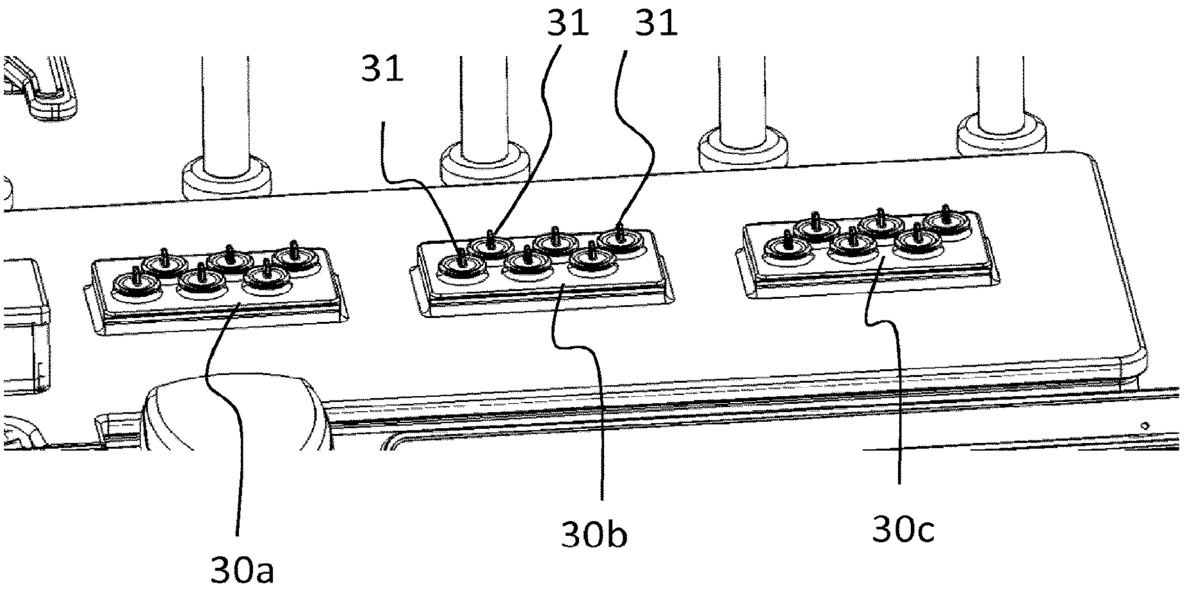
FIG. 8 is a detailed view of the main module with the valve nodes removed.

FIG. 8 is a further detailed view in which, compared to FIG. 7, the valve nodes 10*a* to 10*c* have been detached.

The valve nodes 10*a* to 10*c* can be locked onto the installation-side seats 30*a* to 30*c*.

Figure 9:
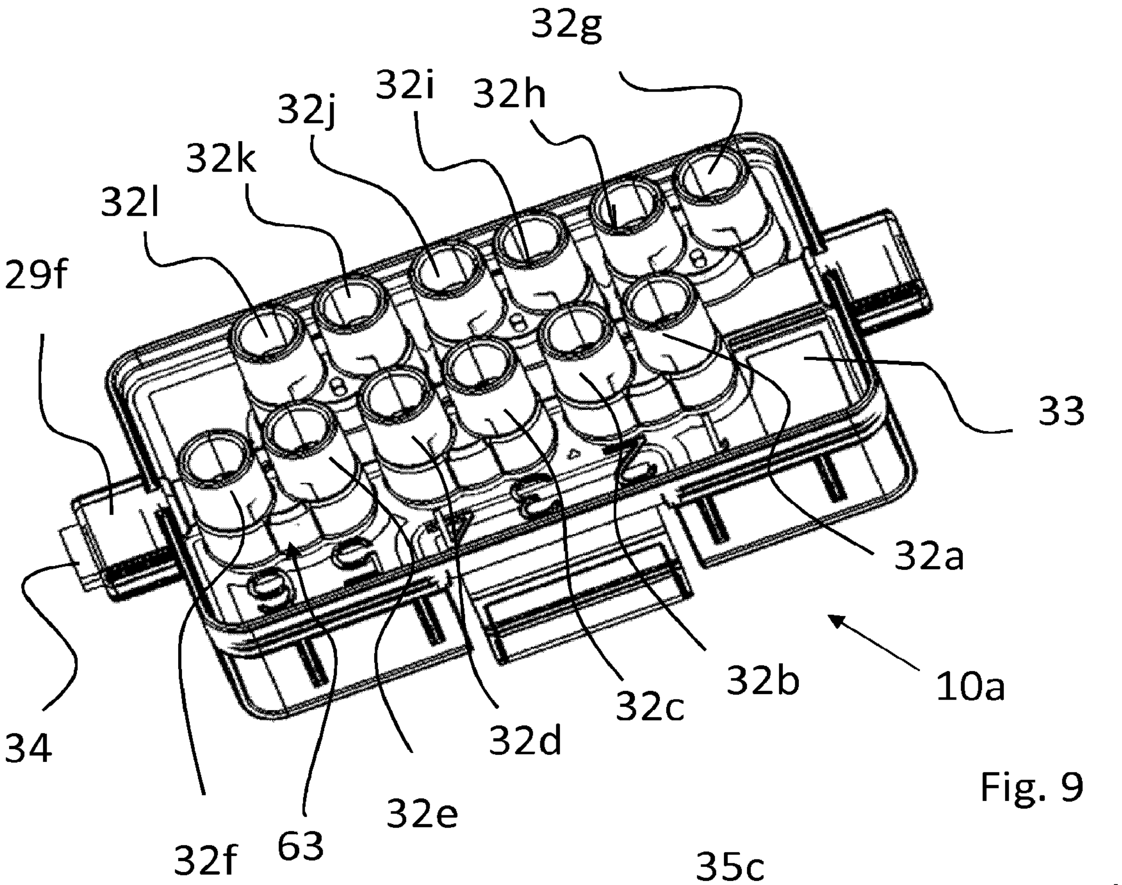
FIG. 9 and FIG. 10 are perspective detailed views of a valve node.
Figure 10:
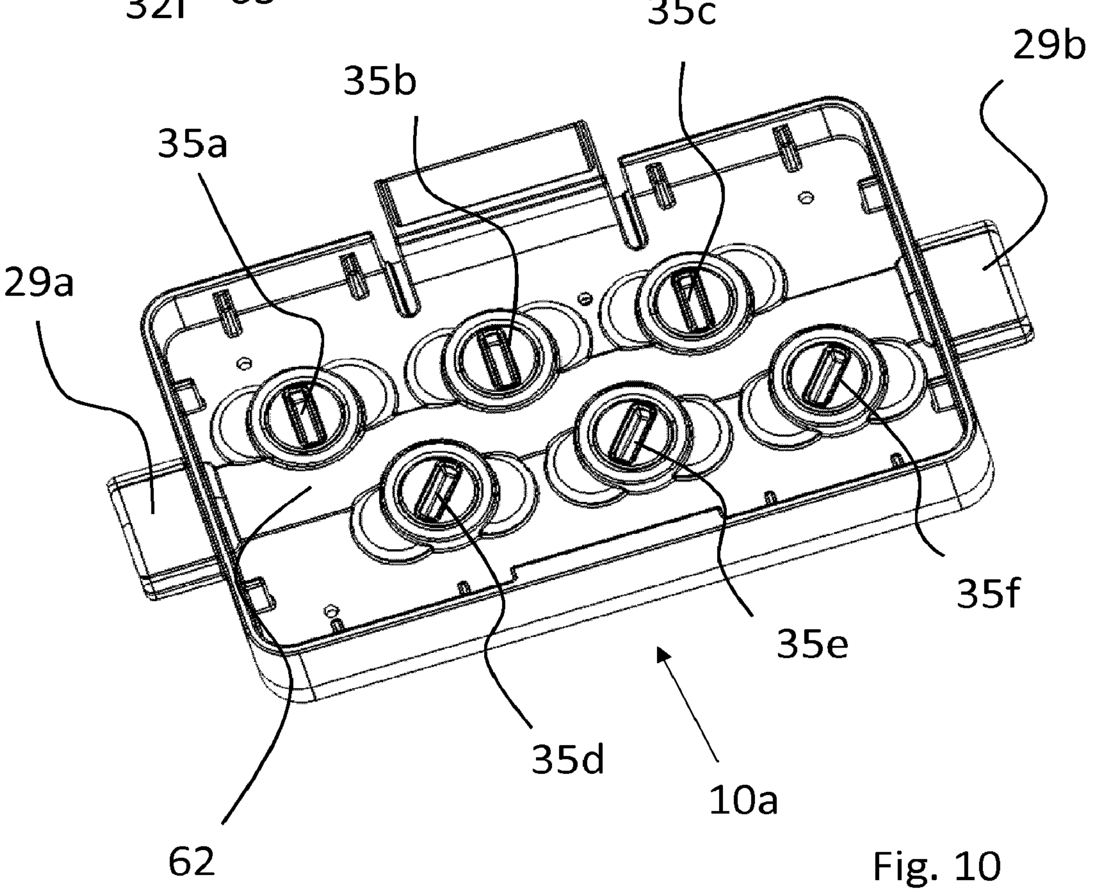

Each of these seats 30*a* to 30*c* comprises carriers 31 which, in this illustrative embodiment, are configured like screwdrivers and which serve to move the actuation members 35*a* to 35*f*, with which the valves 63 of the valve unit 60 can be actuated (see also FIGS. 9 and 10 for example).

FIG. 9 is a perspective detailed view of a valve node 10*a* without connection hoses.

The valve node 10*c* comprises the connections 32*a* to 32*l* for connection of the source containers 5. Each of the connections 32*a* to 32*l* is connected to a hose 37 that leads to a source container 5 (see also FIGS. 11 and 12 for example).

The connections 32*a* to 32*l* are an integral part of the housing 31 of the valve node 10*c*.

The connection 29*f* is closed with a stopper 34.

FIG. 10 shows a perspective view of the underside of the valve node 10*a*.

The connections 29*a* and 29*b* can be seen clearly in this view.

It can also be seen that a central channel 62 extends between the connections 29*a* and 29*b*.

With the valve 63 opened, the liquid flows from the respective connection 32*a* to 32*l* into this central channel 62.

The valves 63 in this illustrative embodiment are configured as 3-way valves. Accordingly, there are only half as many actuation members 35*a*-35*f* as there are connections 32*a*-32*l*.

Specifically, the valves 63 are configured as 3/3-port directional control valves with a closed central position.

The connection 32*e* or 32*f*, for example, can be opened via the actuation member 35*a*.

The individual valve nodes 10*a* to 10*c* are preferably of identical configuration.

In this view, the actuation members 35*a* to 35*c* are in the closed central position, whereas the actuation members 35*d* to 35*f* are located in the open position and have opened an access.

It will be appreciated, however, that only one valve 63 is generally opened during the operation of the installation.

Figure 11:
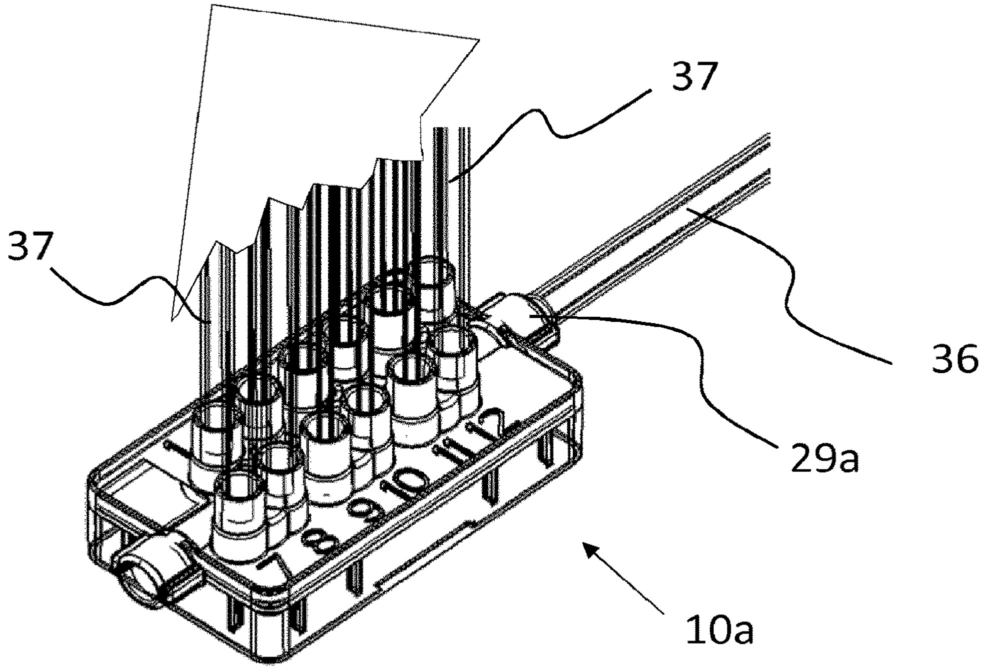
FIG. 11 is a perspective view of the valve node with connection hoses.

FIG. 11 shows a valve node 10*a* with hoses 36, 37.

The hoses 37 serve to connect the source containers 5, and the hose 36 is guided through the pump 9 and serves to connect the target container 6.

This view shows only the start of the hoses 36, 37 at the valve node side.

The hoses 36 and 37 are preferably connected to the connections 29*a* to 29*f* and 32*a* to 32*l* of the respective node 10*a* to 10*c* in such a way that these cannot be removed without destruction.

The valve unit 60 composed of the valve nodes 10*a* to 10*c* and hoses 36, 37 is thus configured as a disposable component.

Figure 12:
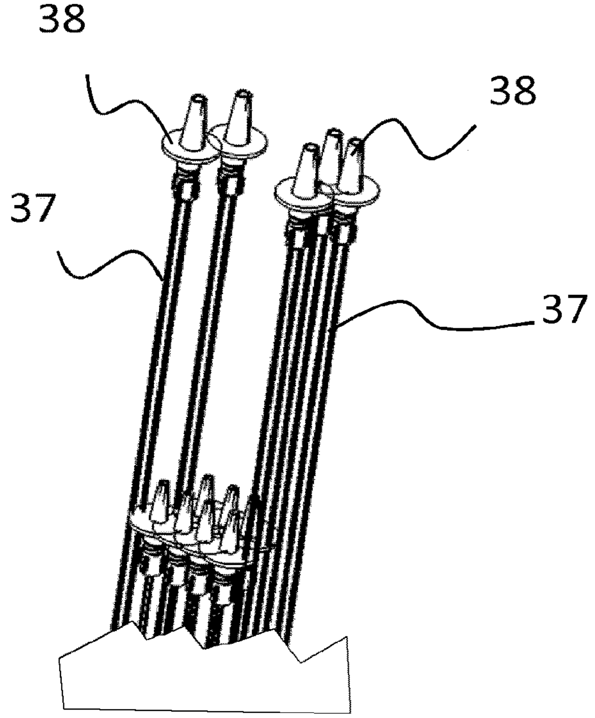
FIG. 12 shows the hoses for connection of the source containers.

FIG. 12 shows a detailed view of the end of the hoses 37 for connection of the source containers 5.

It reveals the connections 38 which, in this illustrative embodiment, are configured as Luer lock connectors with an attached spike.

Figure 13:
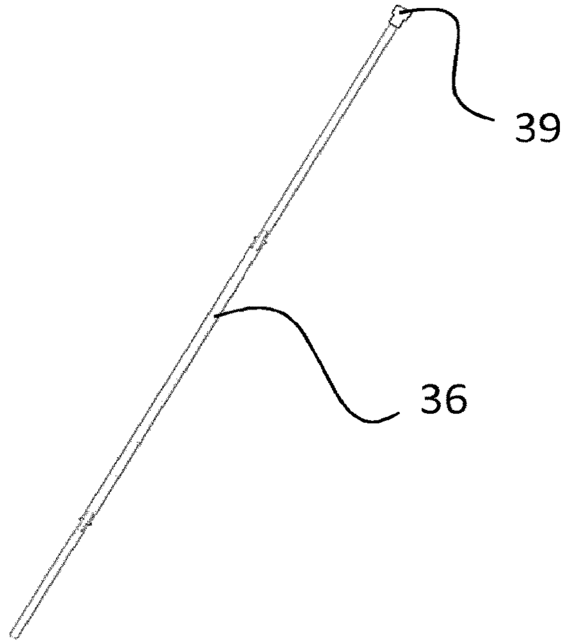
FIG. 13 shows the hose for connection of the target container.

FIG. 13 is a reduced perspective view of the hose 36 for connection of the target container 6.

This hose 36 is connected to the connection 29*a* of the valve node 10*a* and comprises a connection 39 for the target container 6.

The connection 39 can likewise be configured as a Luer lock connector.

Figure 14:
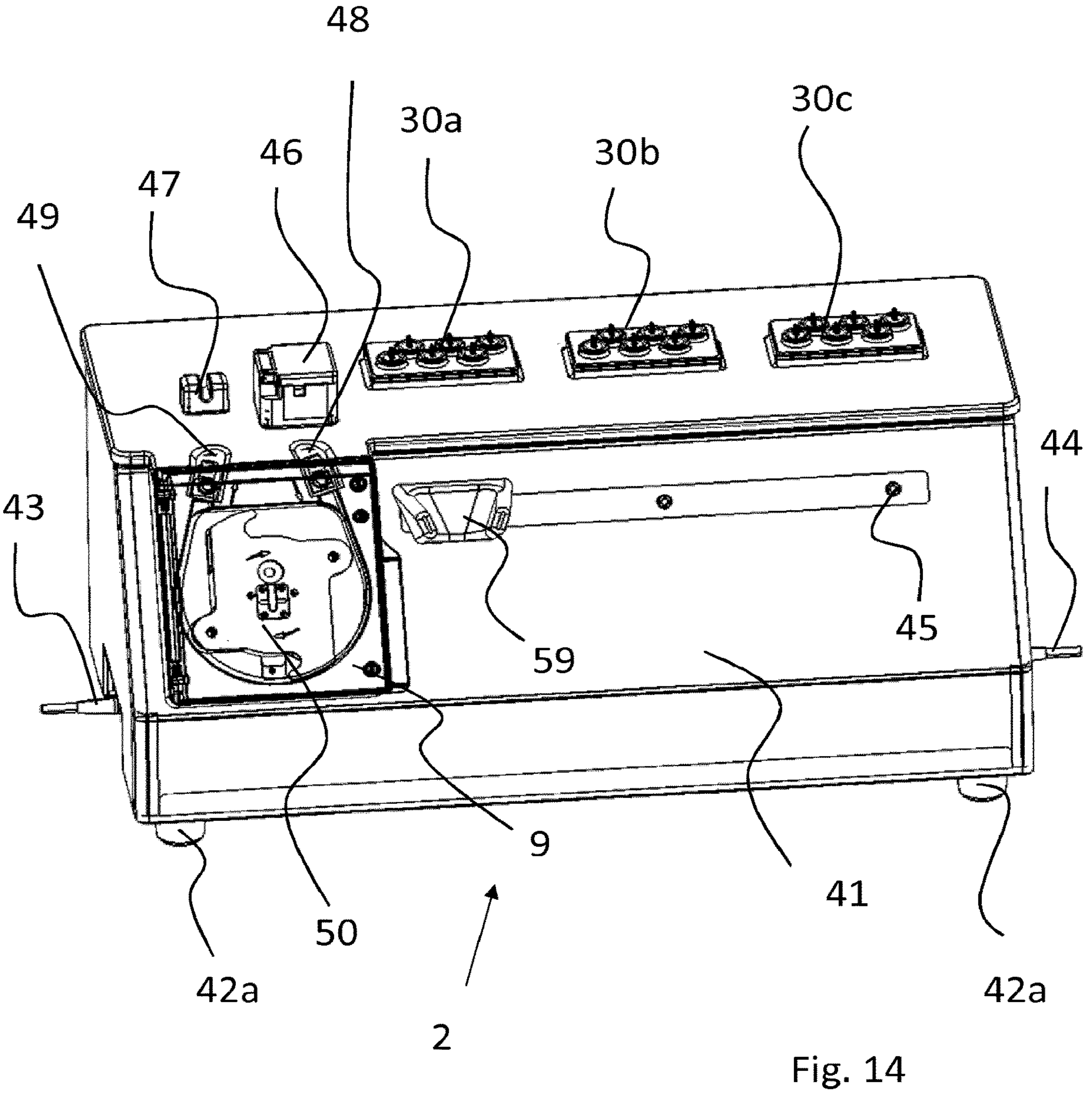
FIG. 14 to FIG. 16 are perspective views of the main module.

FIG. 14 shows a perspective view of the main module 2.

The main module 2 comprises the pump 9, which is configured as a peristaltic pump and has the detachable impeller 50. The impeller 50 is preferably spring-mounted.

With the hose 36 inserted, the pump 9 has a suction side 48 and a pressure side 49, which are determined by the direction of rotation of the impeller 50.

Three seats 30*a* to 30*c* for the valve nodes 10*a* to 10*c* are formed on the upper side of the housing 41.

Depending on the configuration desired by a specific customer, the installation 1 can also comprise just one valve node (e.g. 10*a*) or two valve nodes (e.g. 10*a* and 10*b*).

The state shown here shows the full complement of three seats 30*a* to 30*c*.

A combined flow/bubble sensor 46 and a hose holder 47 are arranged on the upper side of the housing 41.

The hose 36 connected to the valve node 10*a* is firstly inserted into the housing of the combined flow/bubble sensor 46, then guided through the peristaltic pump 9 and thereafter through the hose holder 47.

The front feet 42*a* of the main module 2 can also be seen, which are not inserted into the subframe 11.

It will also be seen that the main module 2 has, on one side, an electrical connection 44 for the screen module 4 and, on the other side, an electrical connection 43 for the balance module 3.

The seat 59 for the scanner 12 comprises a magnet and can be easily detached. For example, it can be mounted on the form-fit element 45 in order to convert the installation 1 to operation by a left-handed person.

Figure 15:
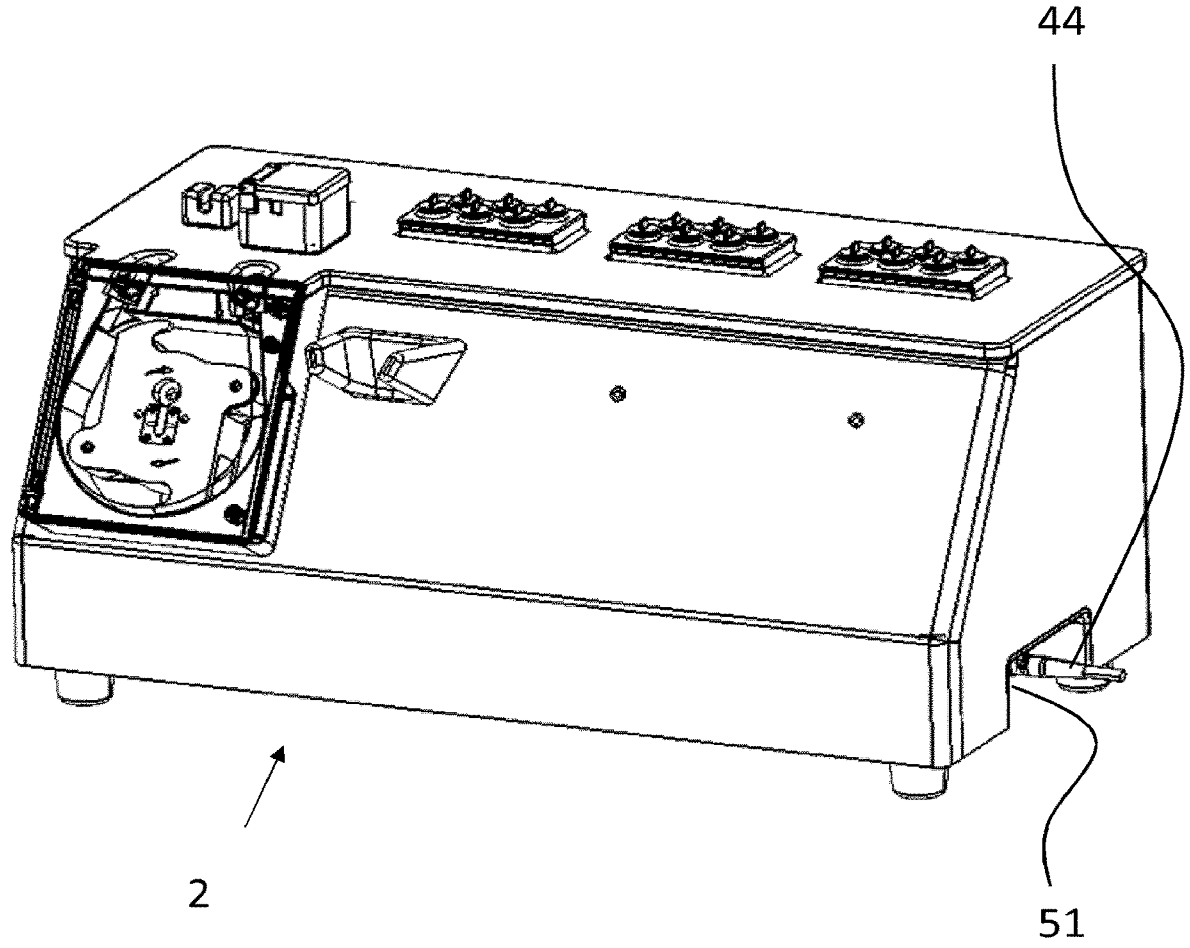

FIG. 15 shows a further perspective view of the main module 2.

It reveals that a grip depression 51 is present on the side with the electrical connection 44.

Figure 16:
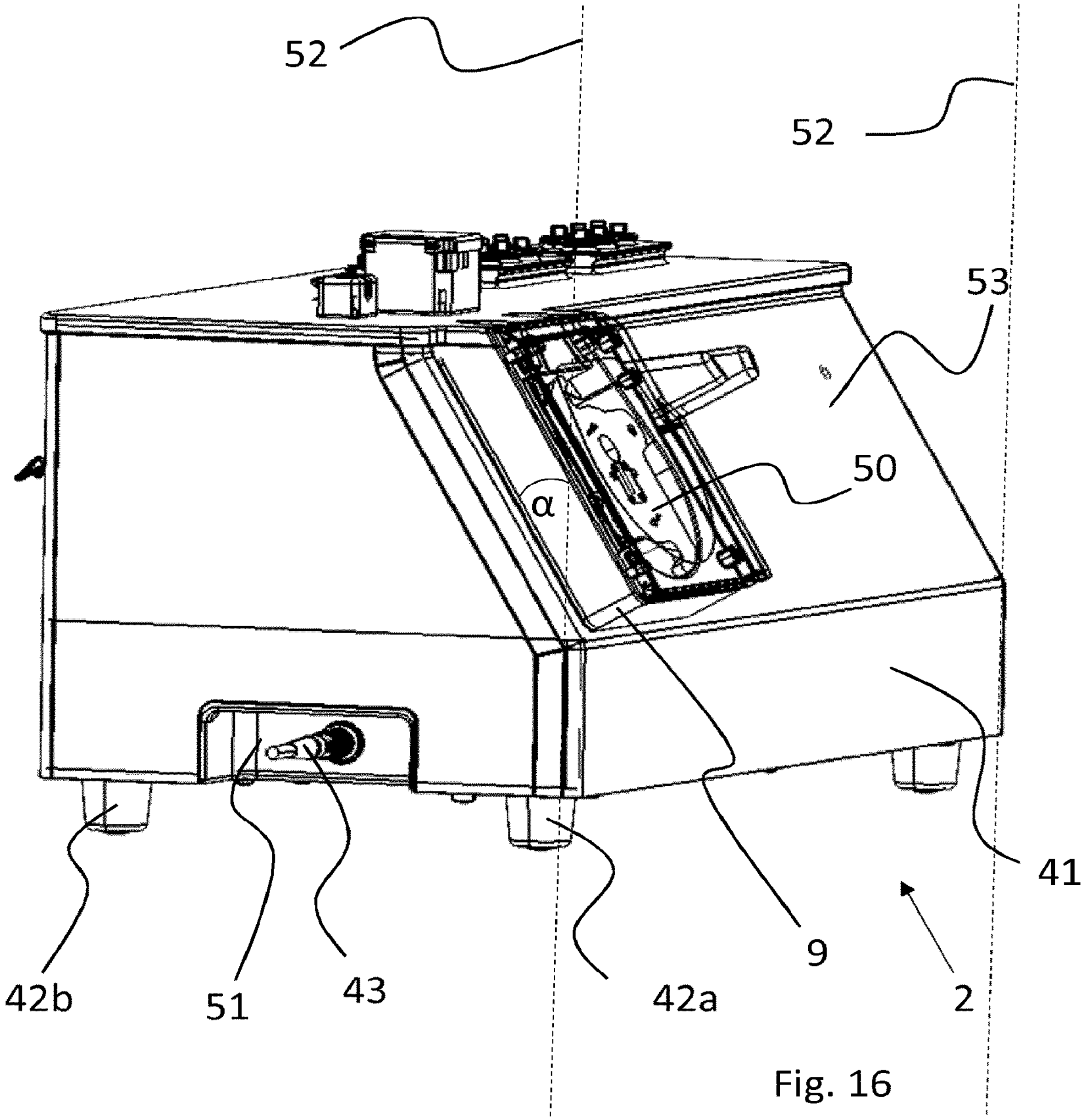

It will be seen from FIG. 16, which likewise shows a perspective view of the main module 2, that a grip depression 51 is also provided on the other side, namely on the side with the electrical connection 43 for the balance module 3.

This view shows one of the rear feet 42*b* that are inserted into the seats 15 of the subframe 11.

It will also be seen that the housing 41 has a beveled upper housing front 53.

On account of the beveled housing front 53, the peristaltic pump 9 and therefore also the impeller 50 are tilted with respect to the vertical.

The vertical plane is spanned by the vertically extending straight lines 52 plotted here, which are arranged at the corners of the housing 41.

The impeller 50, or its upper side shown here, hence the entire pump 9, is tilted at the angle $\alpha$ with respect to this vertical plane. The angle $\alpha$ is preferably between 20° and 40°: in this illustrative embodiment, the angle $\alpha$ is approximately 30°.

By virtue of this configuration, the pump 9 is easily accessible for inserting the hose 39 and/or for cleaning the pump after detachment of the impeller 50.

Moreover, a particularly compact configuration of the main module 2 is permitted.

The screen of the screen module 4 can be pivoted into the region created by the inclination of the upper housing front 53.

Figure 17:
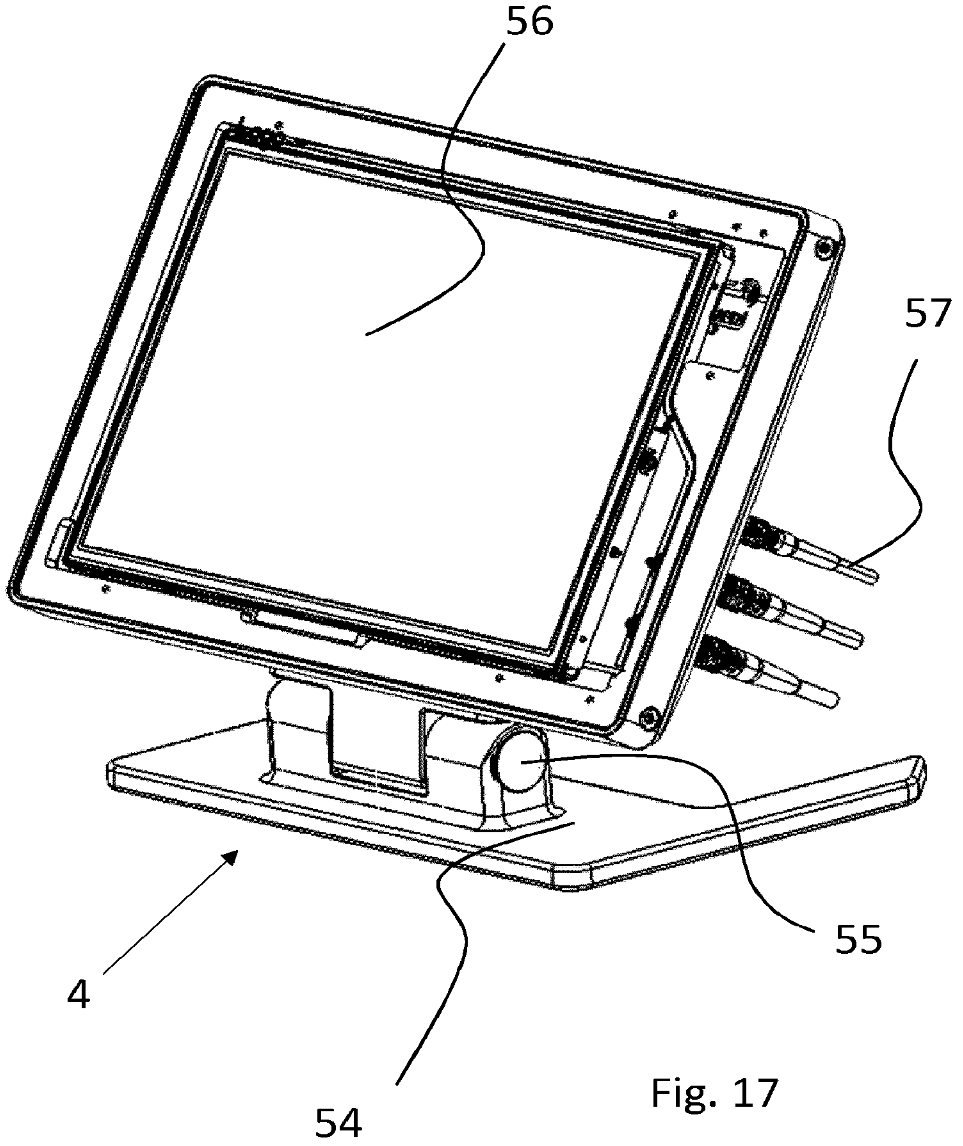
FIG. 17 and FIG. 18 are perspective views of the screen module.

FIG. 17 shows a perspective view of the screen module 4.

The screen module 4 comprises a touchscreen 56, which is connected to the base 54 via a hinge 55.

The touchscreen 56 is pivotable via the hinge 55.

On its rear, the touchscreen 56 comprises connections 57 for connecting to the main module 2.

Figure 18:
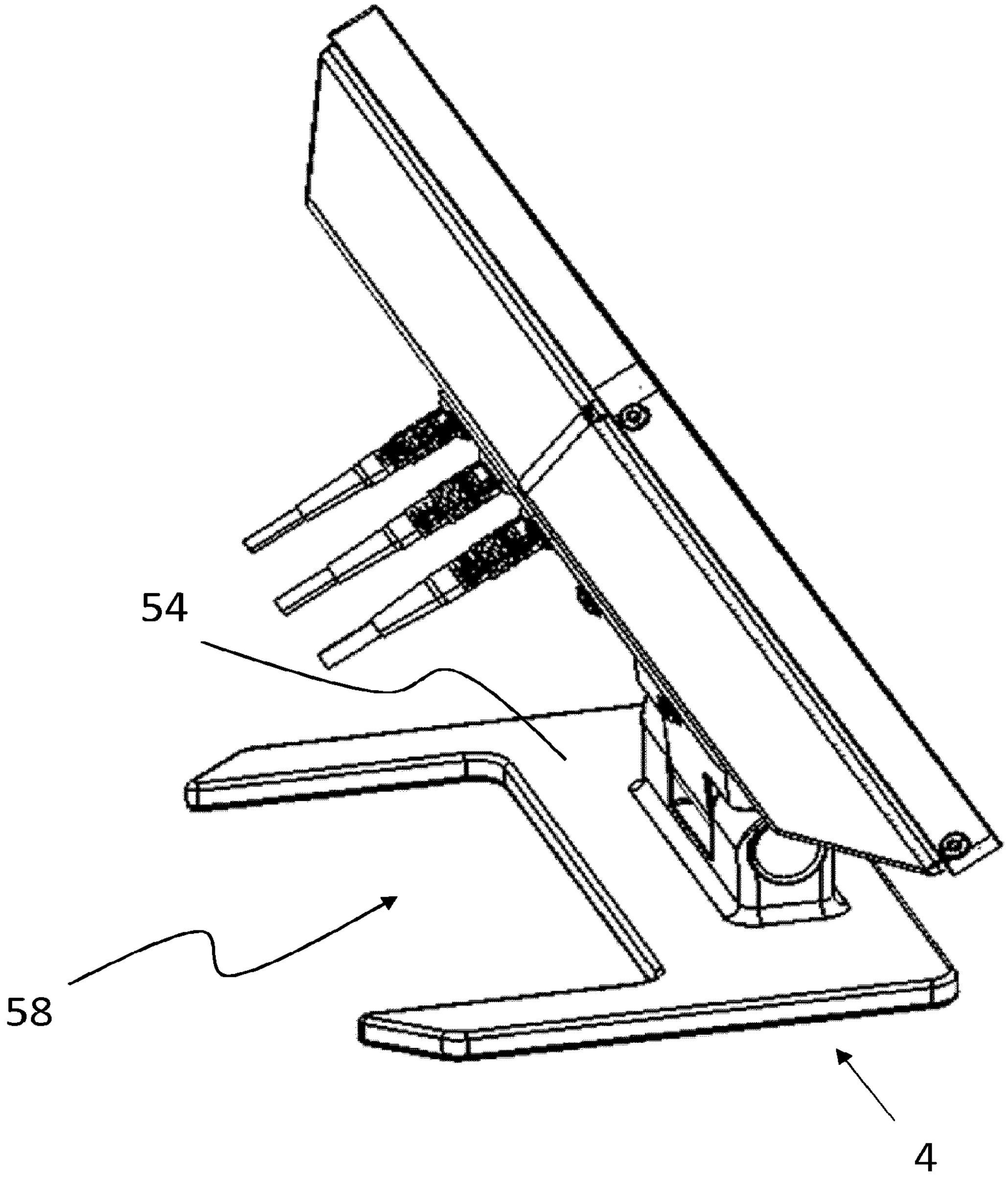

FIG. 18 is a further perspective view of the screen module 4.

It can be clearly seen in this view that the base 54 has a recess 58. The base 54 thus has a fork-shaped configuration.

On account of the recess 58, the base 54 can also be pushed under the main module 2 in the region of the feet 42*a* of the main module 2.

FIG. 19 is a perspective view of a valve unit 60 which, in this illustrative embodiment, is composed of the three valve nodes 10*a* to 10*c*.

Valve nodes 10*a* and 10*b* and valve nodes 10*b* and 10*c*, respectively, are connected to each other by a hose 61.

The unrequired connection 29*f* is closed, and the opposite connection 29*a* is connected to the hose 36 which is guided through the pump 9 and which is connected to the target container 6.

All the connections 32*a*-32*l* of each valve unit 10*a*-10*c* thus lie on a preferably single central channel which is formed by the respective channel 62 of the respective valve node 10*a* to 10*c* and by the hoses 61 and 36.

The valve nodes 10*a* to 10*c* are thus in a cascaded arrangement.

Depending on how many source containers 5 are to be connected, it is possible to use a valve unit 60 which has three valve nodes 10*a*-10*c* as shown here, or which has only two valve nodes or one valve node (not shown).

Figure 20:
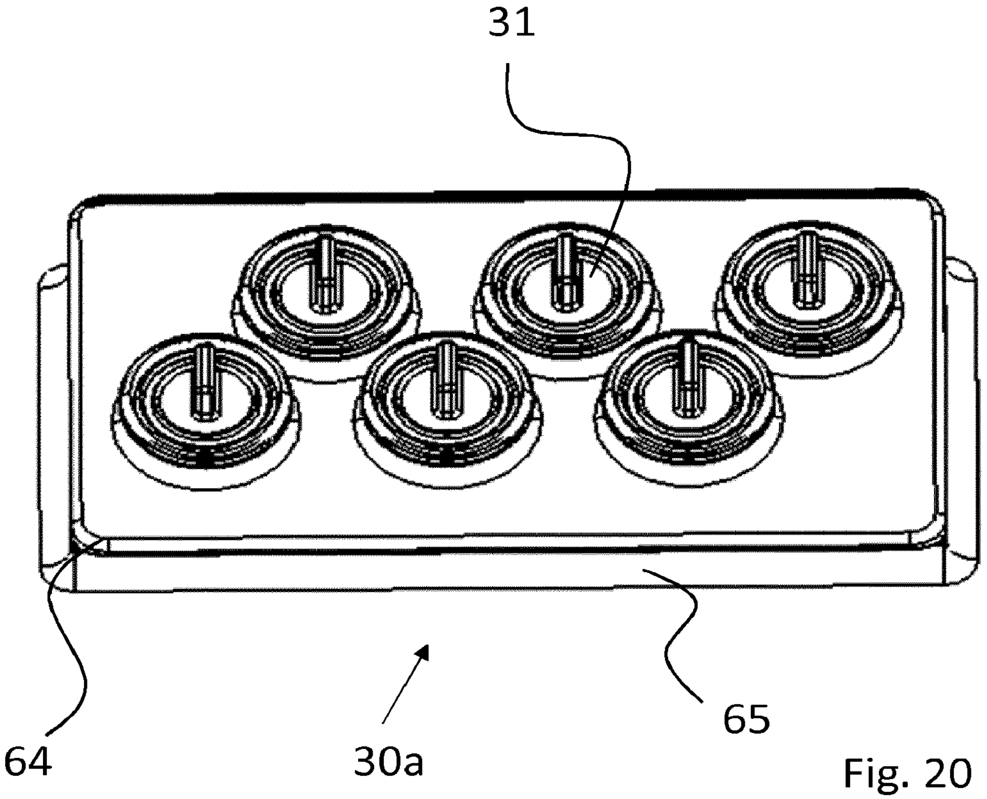
FIG. 20 is a detailed view of a seat for a valve node.

FIG. 20 is a detailed view of the seat 30*a*, already shown in FIG. 14 to FIG. 16, for a valve node 10*a*.

The seat 30*a* comprises a base 65 and is plate-shaped above the base, wherein a circumferential edge 64 protrudes outward.

The circumferential edge 64 serves as a form-fit element for the corresponding valve node 10*a*.

It can be seen that the carriers 31 for the actuation members 35*a*-35*f* of the valve node 10*a* protrude from the plate-shaped seat 30*a*. Alternatively, the carriers 31 can also be recessed (not shown) into the seat 30*a*.

Figure 21:
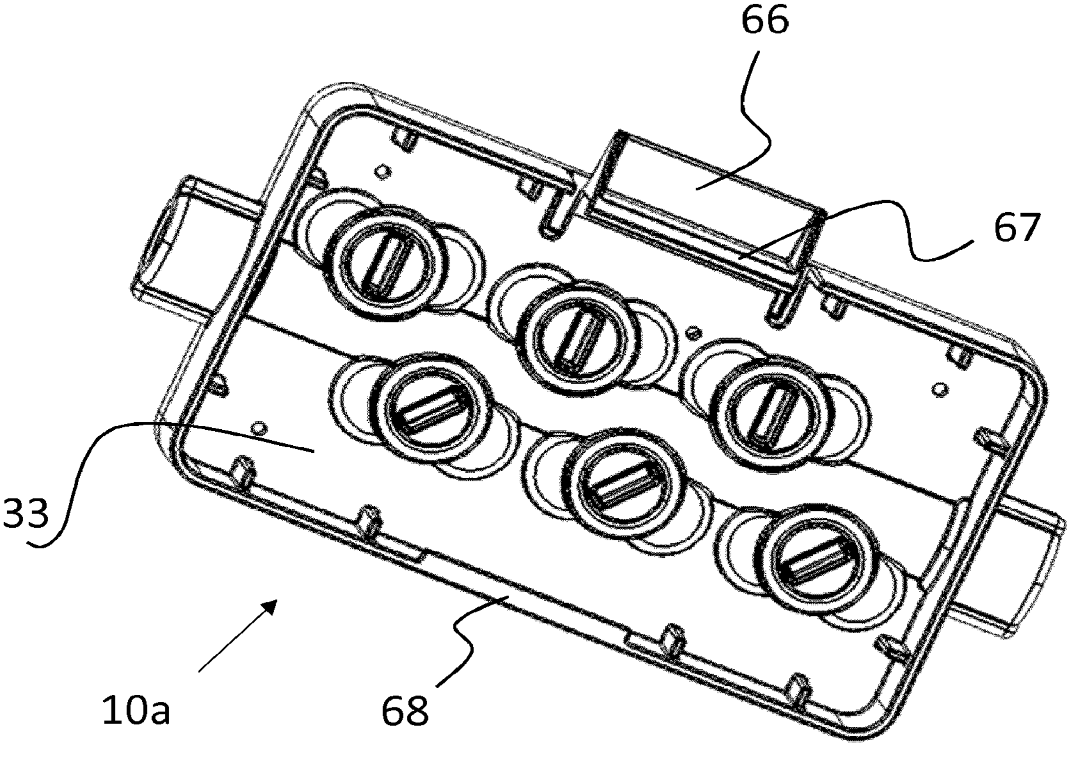
FIG. 21 is a further perspective view of the underside of the valve node.

The underside of the valve node 10*a* can be seen in FIG. 21.

It will be seen that the housing 33 of the valve node 10*a* has, on a rear face, a web 68 which can be pushed under the edge 64 of the seat 30*a*.

On the side opposite the web 68, a grip 66 is arranged which is spring-mounted and likewise has a web 67 which, in the locked state, engages under the edge 64 of the seat 30*a*.

The grip 66 with the web 67 is preferably configured as a resilient plastic component which in particular can also be formed in one piece with the housing 33. Thus, the housing 33 can be configured, for example, as an injection-molded plastic part.

When the valve node 10*a* is locked on, the grip 66 together with the web 67 can initially spring away from the rest of the housing 33, such that the web 67 slides past the edge 64 of the seat 30*a*. The opposite web 68 is in this state pushed on the opposite side under the edge 64.

The grip 66 then springs back in the direction of the housing, and the valve node 10*a* is locked via the web 68 and the web 67.

For replacement of the valve unit 60, the valve node 10*a* can be easily detached from one side by means of the user pulling on the grip 66.

Figure 22:
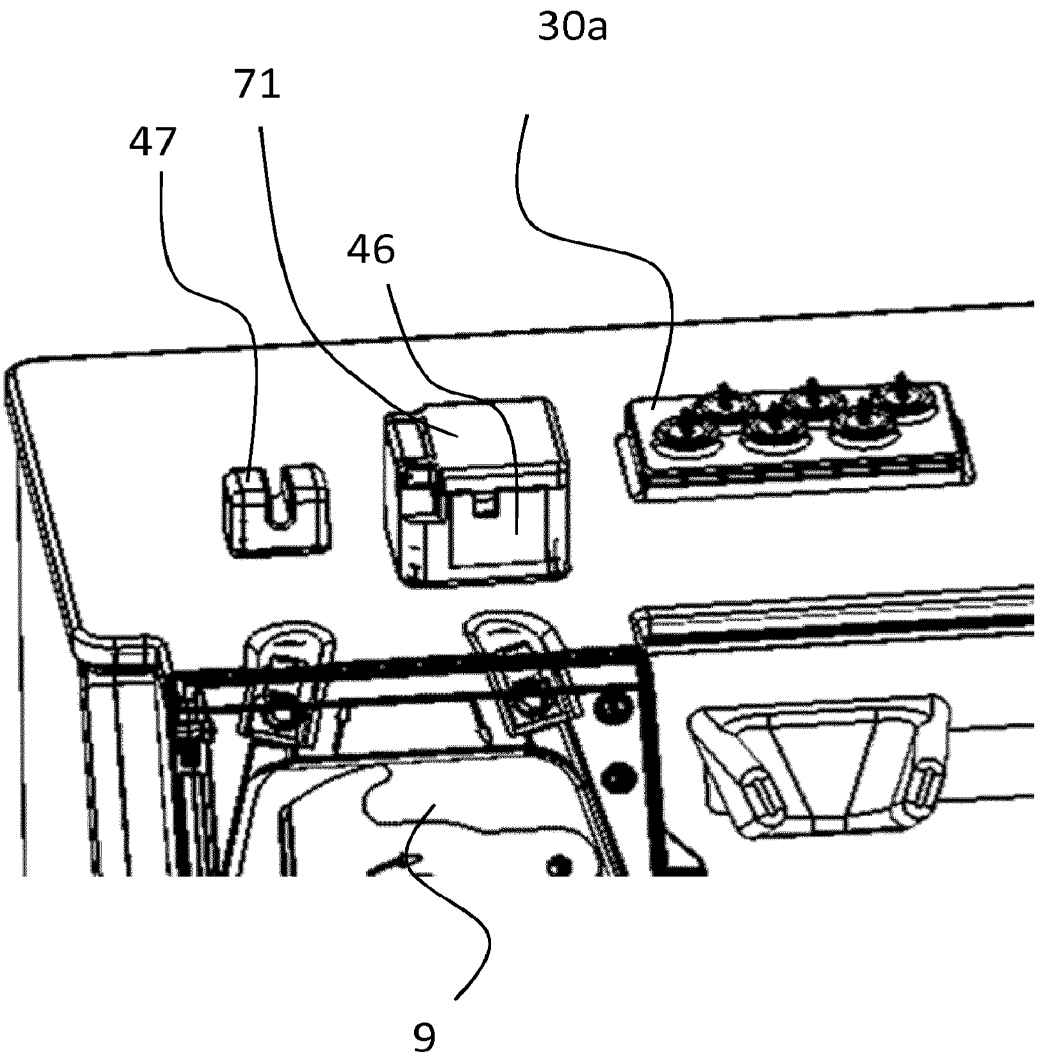
FIG. 22 is a detailed view of the main module of the installation.

FIG. 22 is a detailed view of FIG. 14, showing the combined flow/bubble sensor 46.

The seat 30*a* for the valve node 10*a* can also be seen.

When the valve unit 60 is fitted, the hose 36 connecting the valve node 10*a* to the target container 6 is firstly guided through the combined flow/bubble sensor 46, then through the pump 9 and thereafter through the hose holder 47.

The hose holder 47 ensures a defined position of the hose, which reduces the danger of fluctuating forces being introduced onto the target containers 5 located on the balance module 3.

The combined flow/bubble sensor 46 is thus at the same time arranged close to the valve unit 60.

The combined flow/bubble sensor 46 has a cover 71 which, in this embodiment, can be folded open to one side, such that the hose 36 is then inserted.

It is preferably a sensor with integrated evaluation electronics which thus outputs a measured value of the flow velocity and also a further measured value concerning the presence or absence of bubbles in the hose 46. The sensor with the evaluation electronics of the installation 1 can thus be connected via an interface. If the combined flow/bubble sensor 46 detects a flow velocity that is not plausible with the pump capacity at the respective metering step, an error message can be generated via the screen unit 4.

This can be defined, for example, via a threshold value. For example, a threshold value can be defined as a flow velocity 20 percent below the calculated flow velocity that ought to be present in the respective metering step on account of the control of the pump 9.

Figure 23:
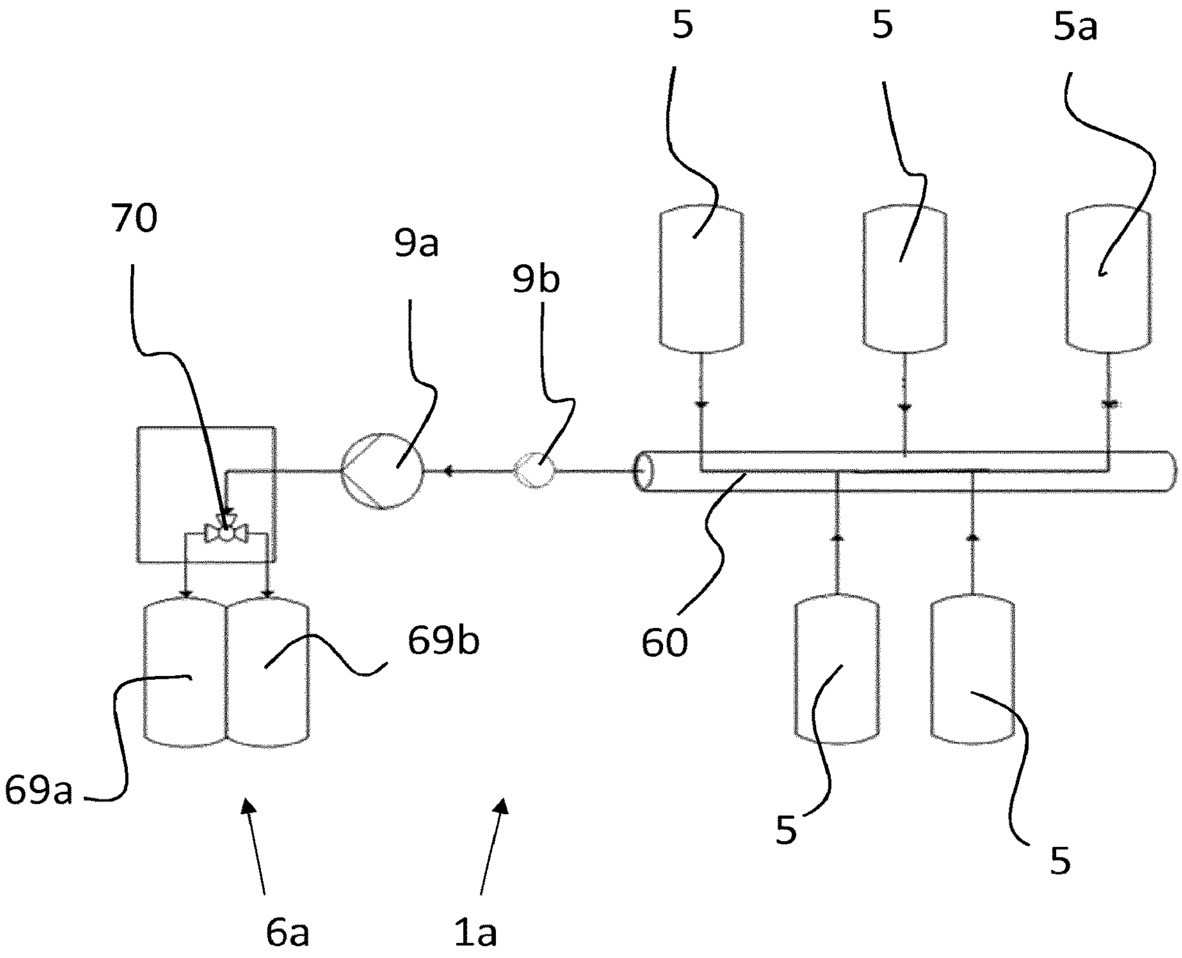
FIG. 23 shows a schematic representation of the basic principle of an alternative embodiment of an installation for producing a medical preparation, which embodiment, in contrast to the embodiment previously shown, comprises two pumps, and also a directional control valve for filling a target container that has two chambers.

FIG. 23 is a schematic representation of the principle of an alternative embodiment of an installation 1*a* in which, by comparison with the installation described above, two possible modifications will be described.

The figure shows schematically that the installation 1*a* has a plurality of source containers 5. In this illustrative embodiment, the source container 5*a* comprises water or universal liquid for flushing the valve unit 60.

The valve unit 60 can be used to control from which source container 5 liquid is removed in the respective metering step.

In contrast to the illustrative embodiment described above, the installation 1*a* comprises two pumps, namely a larger pump 9*a* and a smaller pump 9*b*.

The pump 9*a* has a greater delivery capacity than the pump 9*b* and serves for metering the main constituents of the medical preparation.

The two pumps 9*a* and 9*b* can in particular be peristaltic pumps, wherein the pump 9*a* has inserted into it a hose that has a greater diameter than the hose inserted into the pump 9*b*.

The hose 36, which connects the valve unit 60 to the target container 6*a*, thus preferably comprises two portions of different diameter.

Micro-quantities can be metered with greater precision via the smaller pump 9*b*.

Otherwise, the installation 1*a* can be configured exactly like the above-described installation 1.

As a further modification in relation to the above-described installation 1, the installation 1*a* comprises a directional control valve 70 which is arranged upstream from the target container 6*a*.

It will be appreciated that this modification in relation to the installation 1 can also be provided alone, i.e. without the two pumps 9*a* and 9*b*, or the installation 1*a* can also comprise only the two pumps 9*a* and 9*b* and no directional valve 70.

The target container 6*a* comprises the chambers 69*a* and 69*b*.

By way of the directional control valve 70 controlled by the installation 1*a*, the chambers 69*a* and 69*b* can be filled with a medical preparation of different composition.

The directional control valve 70 is preferably part of a disposable component.

In one embodiment, the directional control valve 70 is actuated by a carrier on the installation side.

In an alternative embodiment of the invention, the directional control valve 70 is actuated manually, that is to say the user attaches the target container 6*a*, initiates a filling procedure for example for the chamber 69*a*, then switches the directional control valve 70 such that liquid can flow into the chamber 69*b*, and starts a further filling procedure for the chamber 69*b*.

Figure 24:
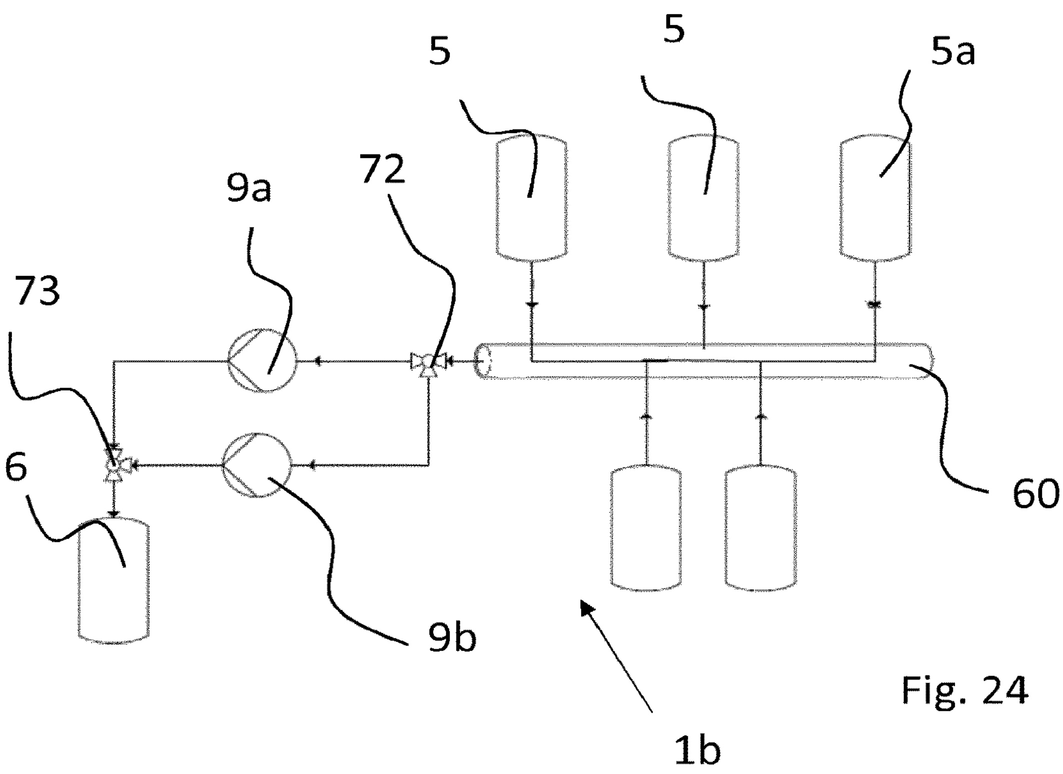
FIG. 24 to FIG. 27 show further illustrative embodiments of the schematic basic principle of an installation with two pumps for producing a medical preparation.

FIG. 24 is a further illustrative embodiment of an installation 1*b* with two pumps 9*a*, 9*b*.

In contrast to the above-described illustrative embodiment, the pumps 9*a* and 9*b* are not connected in series.

Instead, as seen in the direction of flow, the connection to the target container 6 branches off downstream from the valve unit. By way of a directional control valve 72, fluid can be guided either via the pump 9*a* or via the pump 9*b*.

In this illustrative embodiment, the pump 9*b* has a lower delivery capacity than the pump 9*a* and serves for the metering of micro-quantities.

Downstream from the pumps 9*a*, 9*b*, the connection to the target container 6 is brought together again. As is shown in this illustrative embodiment, this can be done via a directional control valve 73, in order to prevent liquid from flowing back in the direction of the pump that is not operating.

Figure 25:
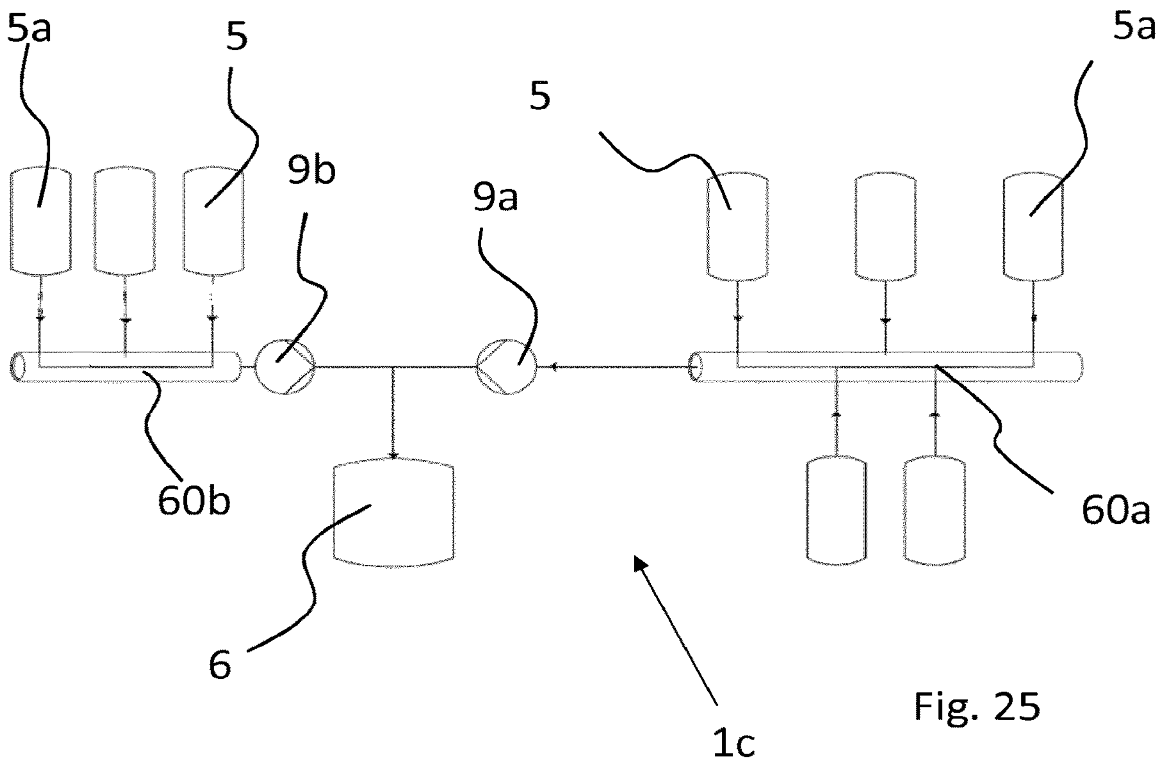

FIG. 25 is a further illustrative embodiment of an installation 1*c* with two pumps 9*a*, 9*b*.

In this illustrative embodiment, two valve units 60*a*, 60*b* are provided. Some of the source containers 5 are connected to the target container 6 via the valve unit 60*a*. Liquids from these containers are conveyed via the pump 9*a* into the target container 6, whereas liquids from the source containers 5 connected to the target container via the valve unit 60*b* are conveyed by the pump 9*b* into the target container 6.

The pump 9*b* and the separate valve unit 60 serve for the metering of micro-quantities.

Both valve units 60*a*, 60*b* are connected respectively to a source container 5*a* which holds universal liquid in order to be able to flush the valve units.

Figure 26:
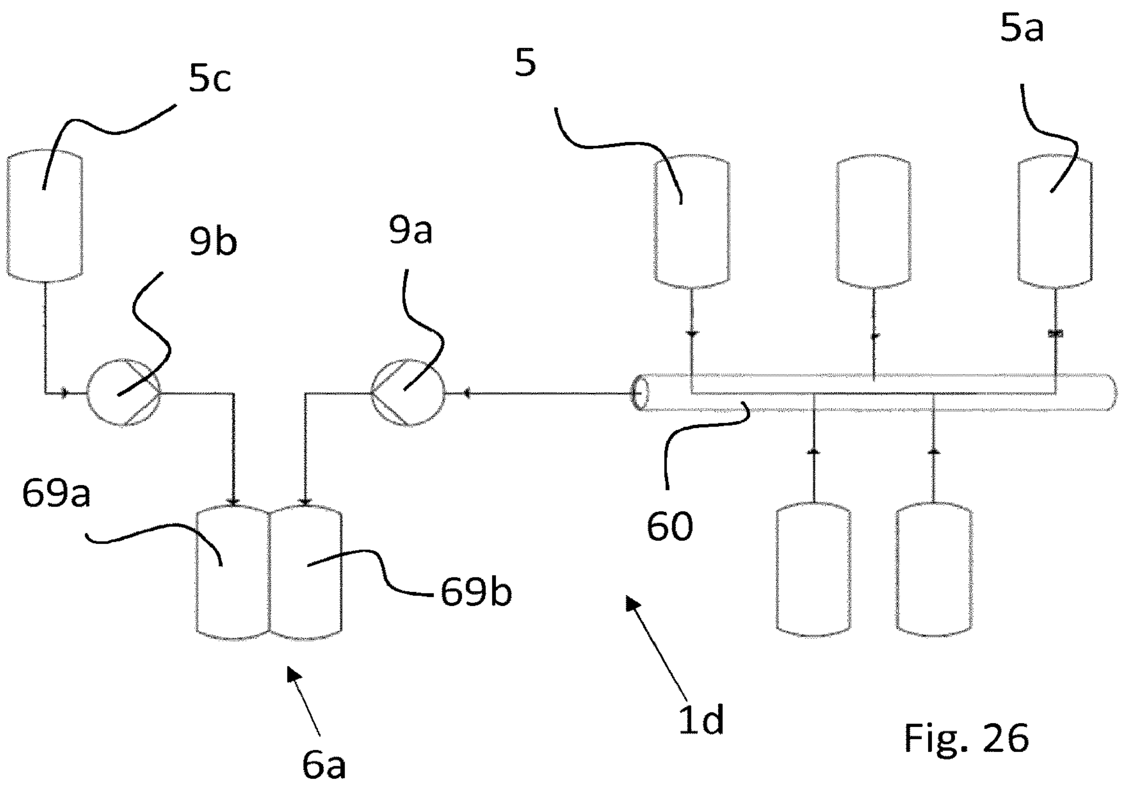

FIG. 26 is an illustrative embodiment of an installation 1*d* with two pumps 9*a*, 9*b*. In this illustrative embodiment, a target container 6*a* with two chambers 69*a*, 69*b* is filled.

The chamber 69*b* is connected via the pump 9*a* and via the valve unit 60 to a plurality of source containers 5, 5*a*.

Liquid is transferred only into chamber 69*b* via the pump 9*a*. The metering from the various source containers takes place by control of the valve unit 60.

The other chamber 69*a* of the target container 6*a* is connected by the pump 9*b* to the source container 5*c*. Thus, only the chamber 69*a* is filled with liquid from the source container 5*c* via the pump 9*b*.

Provision is made in particular that the source container 5*c* holds a lipid-containing constituent for the medical preparation.

Figure 27:
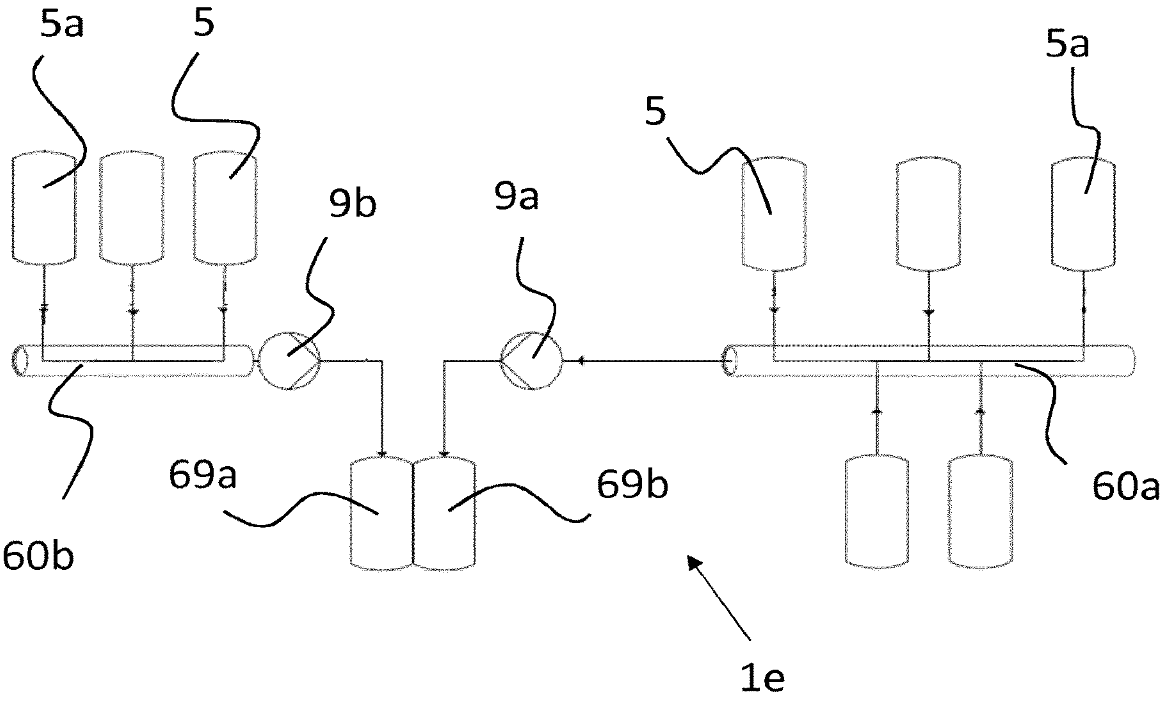

FIG. 27 shows a further embodiment of an installation 1*e* for producing a medical preparation.

In contrast to the embodiment shown in FIG. 26, the pump 9*b* is connected to source containers 5 via a further valve unit 60*b*.

The chamber 69*a* can thus be filled via the pump 9*b*, wherein the metering from the various source containers 5 is controlled via the valve unit 60*b*. The chamber 69*b* is accordingly filled via the pump 9*a*, wherein the metering is controlled via the valve unit 60*a*.

For flushing, a respective source container 5*a* with universal liquid is connected to both valve units.

Figure 28:
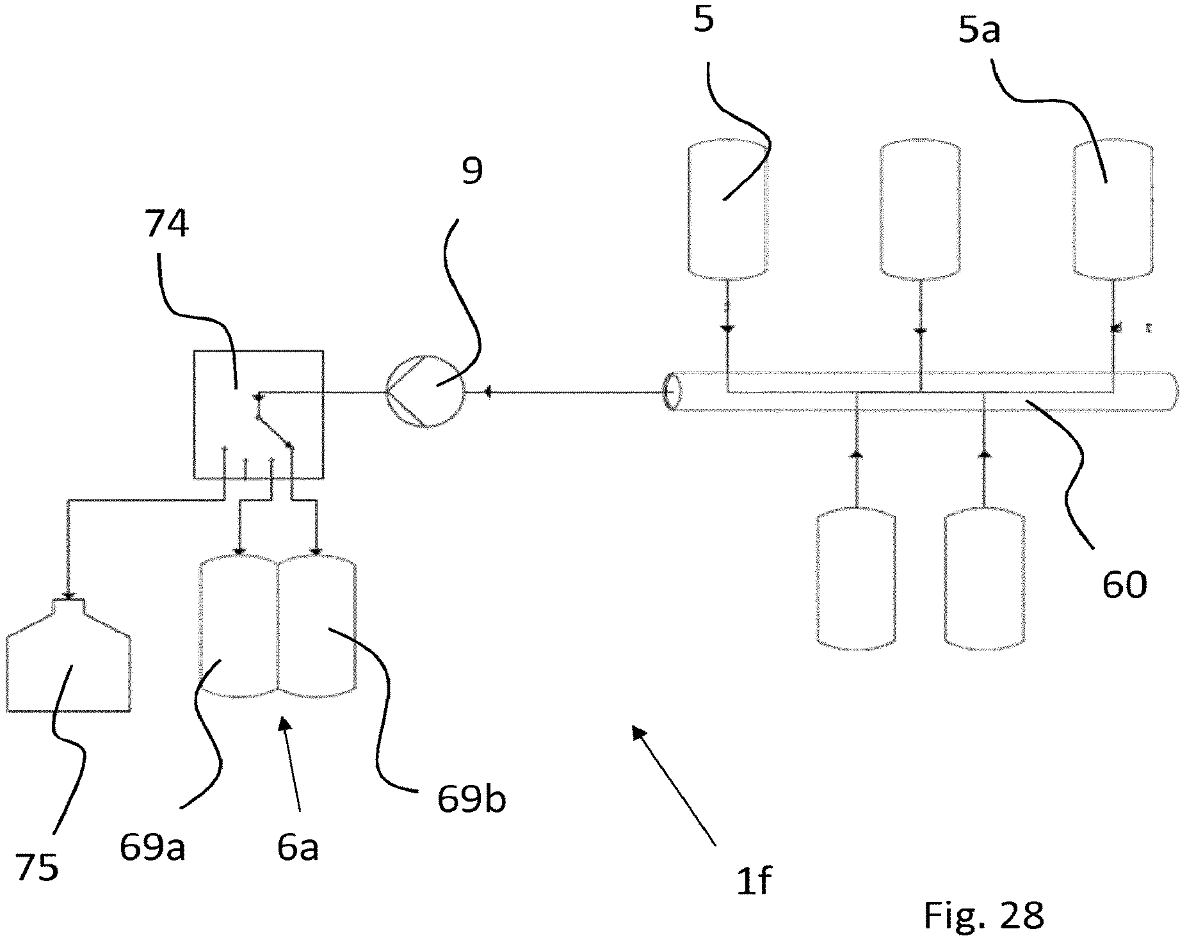
FIG. 28 shows the schematic basic principle of an installation in which a waste bag is connected via a directional control valve parallel to the target container.

FIG. 28 shows a further embodiment of an installation 1*f* for producing a medical preparation.

In this illustrative embodiment, a directional control valve 74 is provided downstream from the valve unit 60, as seen in the direction of flow, by way of which directional control valve 74 a liquid can be transferred from a plurality of source containers 5, 5*a* both into the two chambers 69*a*, 69*b* of a target container 6*a* and also into a waste bag 75.

By way of the waste bag connected at the same time to the target container 6*a*, the inlets to individual source containers 5 can be flushed at any time, for example in order to exchange an individual source container 5 when it is emptied. It is not necessary to flush the entire system when a source container 5 is exchanged. Instead, a source container 5 can also be exchanged while the target container 6*a* is connected.

The directional control valve 74 is preferably configured as an at least 4-port directional control valve.

In an embodiment not shown here, the target container 6*a* can also be configured as a container with only one chamber.

Moreover, the embodiment shown here of an installation 1*f* for producing a medical preparation can also comprise two pumps, in particular as has been described above with reference to FIGS. 23 to 27.

By means of the invention, a compact installation for producing a medical preparation can be made available which is easy and safe to operate.

LIST OF REFERENCE SIGNS

1, 1*a*-1*e* installation
2 main module
3 balance module
4 screen module
5, 5*a*, 5*c* source container
6, 6*a* target container
7 balance pan
8 rod
8*a* bottom part
8*b* top part
9, 9*a*, 9*b* pump, peristaltic pump
10*a*-10*c* valve node
11 subframe
12 scanner
13 seat (for balance)
14 bore
15 seat (for main module)
16 bore
17 portion
18 seat (for rod)
19 foot
20 recess (for source container)
21 holder (for source container)
22 balance
23 connection
24 hose
25 hose holder
26 housing
27 pin
28*a,b* feet (balance)
28*a-f* connection
30*a*-30*c* seat (for valve node)
31 carrier
32*a*-32*l* connection (source container)
33 housing
34 stopper
35*a*-35*f* actuation member
36 hose
37 hose
38 connection
39 connection
40 electrical connection
41 housing
42*a* 42*b* foot
43 connection (balance)
44 connection (screen)
45 form-fit element
46 combined flow/bubble sensor
47 hose holder
48 suction side
49 pressure side
50 impeller
51 grip depression
52 line
53 upper housing front
54 base
55 hinge
56 touchscreen
57 connection
58 recess
59 seat (scanner)
60 valve unit
61 hose
62 channel
63 valve
64 edge
65 base
66 grip
67 web

68 web
69*a*, 69*b* chamber
70 directional control valve
71 flap
72 directional control valve
73 directional control valve
74 directional control valve
75 waste bag

The invention claimed is:

1. An apparatus configured to produce a medical preparation, the apparatus comprising:

a valve unit comprising a plurality of inlets and an outlet, each of the plurality of inlets being configured to be in fluid communication with a respective one of a plurality of first source containers, and the valve unit being configured to control fluid communication between each of the plurality of inlets and the outlet;

a first pump in fluid communication with the outlet of the valve unit and comprising an outlet;

a first tube connected to the outlet of the first pump and configured to connect to a first inlet of a target container, wherein the first pump is configured to pump liquid from the outlet of the valve unit directly to the first inlet of the target container via the first tube;

a second pump configured to be in fluid communication with at least one second source container and comprising an outlet; and a second tube connected to a second outlet of the second pump and configured to connect to a second inlet of the target container, wherein the second pump is configured to pump liquid from the at least one second source container directly to the second inlet of the target container via the second tube.

2. The apparatus of claim 1, wherein:

the target container comprises a first chamber comprising the first inlet and a second chamber, that is different from the first chamber, comprising the second inlet, the first pump is configured to pump liquid from the outlet of the valve unit directly to the first inlet of the first chamber of the target container via the first tube, and the second pump is configured to pump liquid from the at least one second source container directly to the second inlet of the second chamber of the target container via the second tube.

3. The apparatus of claim 1, wherein:

the first pump is configured to pump liquid from the outlet of the valve unit only to the first inlet of the target container via the first tube, and the second pump is configured to pump liquid from the at least one second source container only to the second inlet of the target container via the second tube.

4. The apparatus of claim 1, further comprising:

a third tube connected to the outlet of the valve unit and an inlet of the first pump; and a fourth tube connected to the at least one second source container and an inlet of the second pump.

5. The apparatus of claim 1, wherein:

the valve unit is a first valve unit, the at least one second source container is one of a plurality of second source containers, the apparatus further comprises a second valve unit comprising a plurality of inlets and an outlet, each of the plurality of inlets of the second valve unit being configured to be in fluid communication with a respective one of the plurality of second source containers, and the second valve unit being configured to control fluid communication between each of the plurality of inlets of the second valve unit and the outlet of the second valve unit, the second pump is in fluid communication with the outlet of the second valve unit, and the second pump is configured to pump liquid from the outlet of the second valve unit directly to the second inlet of the target container via the second tube.

6. The apparatus of claim 5, wherein the first valve unit and the second valve unit are distinct units.

7. The apparatus of claim 1, wherein:

the first pump is peristaltic, and the second pump is peristaltic.

8. A system configured to produce a medical preparation, the system comprising:

a plurality of first source containers;

at least one second source container;

a target container comprising a first chamber comprising a first inlet and a second chamber, that is different from the first chamber, comprising a second inlet;

a valve unit comprising a plurality of inlets and an outlet, each of the plurality of inlets being in fluid communication with a respective one of the plurality of first source containers, and the valve unit being configured to control fluid communication between each of the plurality of inlets and the outlet;

a first pump in fluid communication with the outlet of the valve unit and comprising an outlet;

a first tube connected to the outlet of the first pump and configured to connect to the first inlet of the target container, wherein the first pump is configured to pump liquid from the outlet of the valve unit directly to the first inlet of the first chamber of the target container via the first tube;

a second pump in fluid communication with the at least one second source container and comprising an outlet; and a second tube connected to a second outlet of the second pump and configured to connect to the second inlet of the target container, wherein the second pump is configured to pump liquid from the at least one second source container directly to the second inlet of the second chamber of the target container via the second tube.

9. The system of claim 8, wherein the at least one second source container comprises a constituent comprising a lipid.

10. The system of claim 8, wherein:

the first pump is configured to pump liquid from the outlet of the valve unit only to the first inlet of the first chamber of the target container via the first tube, and the second pump is configured to pump liquid from the at least one second source container only to the second inlet of the second chamber of the target container via the second tube.

11. The system of claim 7, further comprising:

a third tube connected to the outlet of the valve unit and an inlet of the first pump; and a fourth tube connected to the at least one second source container and an inlet of the second pump.

12. The system of claim 8, wherein:

the valve unit is a first valve unit, the at least one second source container is one of a plurality of second source containers, the system further comprises a second valve unit comprising a plurality of inlets and an outlet, each of the plurality of inlets of the second valve unit being in fluid communication with a respective one of the plurality of second source containers, and the second valve unit being configured to control fluid communication between each of the plurality of inlets of the second valve unit and the outlet of the second valve unit, the second pump is in fluid communication with the outlet of the second valve unit, and the second pump is configured to pump liquid from the outlet of the second valve unit directly to the second inlet of the second chamber of the target container via the second tube.

13. The system of claim 12, wherein the first valve unit and the second valve unit are distinct units.

14. The system of claim 12, wherein:

one of the plurality of first source containers comprises a universal fluid that is configured to flush the first valve unit, and one of the plurality of second source containers comprises another universal fluid that is configured to flush the second valve unit.

15. The system of claim 12, wherein a first of the plurality of first source containers comprises at least one different ingredient than a second of the plurality of first source containers.

16. The system of claim 15, wherein a first of the plurality of second source containers comprises at least one different ingredient than a second of the plurality of second source containers.

17. The system of claim 16, wherein:

the first of the plurality of first source containers comprises at least one common ingredient with the first of the plurality of second source containers, and the second of the plurality of first source containers comprises at least one common ingredient with the second of the plurality of second source containers.

18. The system of claim 8, wherein:

the first pump is peristaltic, and the second pump is peristaltic.

19. An apparatus configured to produce a medical preparation, the apparatus comprising:

a first valve unit comprising a plurality of inlets and an outlet, each of the plurality of inlets being configured to be in fluid communication with a respective one of a plurality of first source containers, and the first valve unit being configured to control fluid communication between each of the plurality of inlets and the outlet;

a second valve unit comprising a plurality of inlets and an outlet, each of the plurality of inlets of the second valve unit being configured to be in fluid communication with a respective one of a plurality of second source containers, and the second valve unit being configured to control fluid communication between each of the plurality of inlets of the second valve unit and the outlet of the second valve unit;

a first pump in fluid communication with the outlet of the first valve unit, the first pump being configured to pump liquid from the outlet of the first valve unit directly to a target container; and a second pump in fluid communication with the outlet of the second valve unit, the second pump being configured to pump liquid from the outlet of the second valve unit directly to the target container.

* * * * *